(12) United States Patent
Welling et al.

(10) Patent No.: US 8,571,317 B2
(45) Date of Patent: Oct. 29, 2013

(54) SYSTEMS AND METHODS FOR AUTOMATICALLY PROCESSING ELECTRONIC DOCUMENTS USING MULTIPLE IMAGE TRANSFORMATION ALGORITHMS

(75) Inventors: Girish Welling, Nashua, NH (US); Nirupam Sarkar, Westford, MA (US); Tushar Mahata, Jersey City, NJ (US); Vartika Singh, Lawrence, MA (US); Depankar Neogi, Wilmington, MA (US); Steven K. Ladd, North Andover, MA (US)

(73) Assignee: Gruntworx, LLC, Franklin, NC (US)

( * ) Notice: Subject to any disclaimer, the term of this patent is extended or adjusted under 35 U.S.C. 154(b) by 237 days.

(21) Appl. No.: 13/007,452

(22) Filed: Jan. 14, 2011

(65) Prior Publication Data

US 2011/0255782 A1     Oct. 20, 2011

Related U.S. Application Data

(60) Provisional application No. 61/295,210, filed on Jan. 15, 2010.

(51) Int. Cl.
*G06K 9/34* (2006.01)
(52) U.S. Cl.
USPC .......................................... 382/173; 382/190

(58) Field of Classification Search
USPC .............. 382/173, 176, 180, 181, 190, 248; 375/E7.044; 714/E11.008; 715/764, 715/788, 768, 204
See application file for complete search history.

(56) References Cited

U.S. PATENT DOCUMENTS

| 5,604,824 | A | * | 2/1997 | Chui et al. | 382/248 |
|---|---|---|---|---|---|
| 5,848,184 | A | * | 12/1998 | Taylor et al. | 382/173 |
| 8,086,038 | B2 | * | 12/2011 | Ke et al. | 382/176 |
| 8,276,088 | B2 | * | 9/2012 | Ke et al. | 715/768 |

* cited by examiner

*Primary Examiner* — Anh Hong Do
(74) *Attorney, Agent, or Firm* — Chambliss, Bahner & Stophel, P.C.

(57) ABSTRACT

In a document analysis system that receives and processes jobs from a plurality of users, in which each job may contain multiple electronic documents, to extract data from the electronic documents, a method of automatically pre-processing each received electronic document using a plurality of image transformation algorithms to improve subsequent data extraction from said document is provided. The method includes: electronically partitioning each received electronic document page into pieces; automatically processing each piece of the received electronic document page using each of a plurality of image pre-processing algorithms to produce a plurality of image variations of each piece; and analyzing the outputs of subsequent processing and data extraction, on each of the image variations of the pieces to determine which output is best, from the plurality of outputs for each piece.

1 Claim, 51 Drawing Sheets

38.43
36.79
20.18
95.40
Gross Proceeds*

⇧

38.43
36.79
20.18
95.40
Gross Proceeds*

| 5 Fair market value of account |
|---|
| $ 23,230.33 |

| 6 Medicare tax withheld |
|---|
| 131.52 |

Employee's first name and initial     Last name     Suff.

John Smith
1 Tech Drive
Andover, MA 01☐10

Employee's address and ZIP code

PARTICIPANT'S name
John Smith

Street address (including apt. no.)
1 Tech Drive

City, state, and ZIP code
Andover, MA 01☐10

FIG. 19

| 7 IRA [X] | SEP [ ] | SIMPLE [ ] | Roth IRA [ ] |

| 13 Statutory employee [ ] | Retirement plan [ ] | Thired-party sick pay [ ] |

| 2b Taxable amount not determined [ ] | Total distribution [X] |

FIG. 20

John Smith
1 Tech Drive
Andover, MA 01810

USAA FEDERAL SAVINGS BANK
C/O USAA LIFE INSURANCE COMPANY
9800 FREDERICKSBURG ROAD
SAN ANTONIO, TX 78288

FIG. 21

**Copy B
For Recipient**

This is important tax information and is being furnished to the Internal Revenue Service. If you are required to file a return, a negligence penalty or other sanction may be imposed on you if this income is taxable and the IRS determines that it has not been reported.

FIG. 22

Details of Long Term Gain (Loss) 2009

*This section shows your sales of securities during the year. The "Sale Proceeds" column excludes any accrued income you may have received. In addition, although cash in lieu less than $20 is not included on Form 1099-B (if applicable), it is included in this section. Please note, this material is being prepared for informational purposes only and should not be used for tax preparation without the assistance of your tax advisor.*

| Reference number | Quantity | Security Description | Opening Trade Date | Closing Trade Date | Sale Proceeds | Cost | Gain (Loss) |
|---|---|---|---|---|---|---|---|
| 125000020 | 15 | ISHARES RUSSELL MIDCAP VALUE INDEX FD | 10/08/07 | 03/04/09 | $313.67 | $772.97 | ($459.30) |
|  | 27 |  | 01/18/08 | 03/17/09 | 564.62 | 1,128.49 | (563.87) |
| 125000030 | 5 | ISHARES RUSSELL MIDCAP VALUE INDEX FD | 01/18/08 | 03/17/09 | 111.39 | 208.98 | (97.59) |
| 125000040 | 30 | ISHARES RUSSELL MIDCAP VALUE INDEX FD | 01/18/08 | 04/17/09 | 814.17 | 1,253.88 | (439.71) |
| 125000050 | 89 | ISHARES RUSSELL MIDCAP GROWTH INDEX FD | 10/08/07 | 03/04/09 | 2,388.90 | 5,285.27 | (2,896.37) |
|  | 78 |  | 01/18/08 | 03/17/09 | 2,093.65 | 3,893.58 | (1,799.93) |
| 125000060 | 3 | ISHARES RUSSELL MIDCAP GROWTH INDEX FD | 01/18/08 | 03/17/09 | 85.27 | 149.75 | (64.48) |
| 125000070 | 13 | ISHARES RUSSELL MIDCAP GROWTH INDEX FD | 01/18/08 | 04/17/09 | 435.58 | 648.93 | (213.35) |
| 125000080 | 292 | ISHARES RUSSELL 1000 VALUE IND FUND | 10/08/07 | 03/04/09 | 10,492.70 | 25,558.38 | (15,065.68) |
| 125000090 | 28 | ISHARES RUSSELL 1000 VALUE IND FUND | 10/08/07 | 03/17/09 | 1,089.29 | 2,450.80 | (1,361.51) |
| 125000100 | 109 | ISHARES RUSSELL 1000 VALUE IND FUND | 10/08/07 | 04/17/09 | 4,881.98 | 9,540.63 | (4,658.65) |

FIG. 23

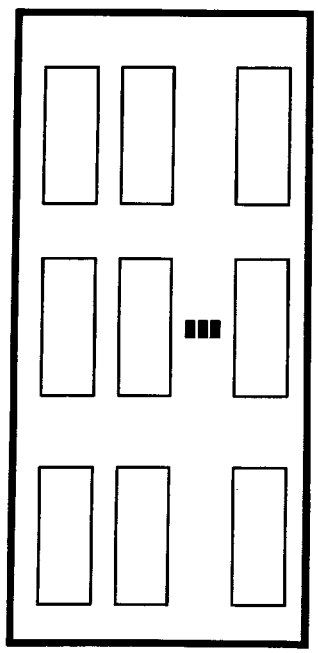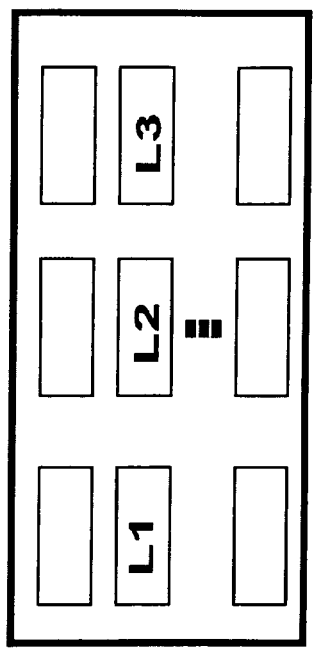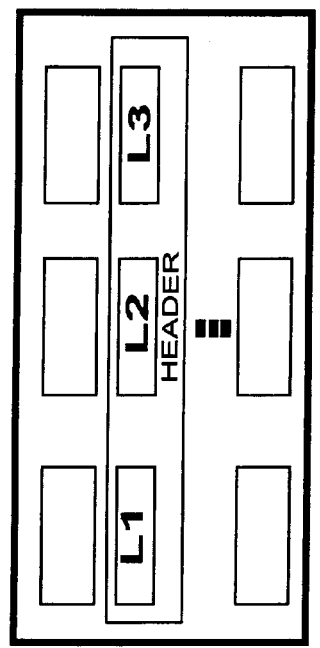
FIG. 25

| Description (7) | CUSIP (1b) | Quantity | Event | Date of Sale or Exchange (1a) | Stocks, Bonds, etc (2) $ | Federal Income Tax Withheld (4) |
|---|---|---|---|---|---|---|
| DEUTSCHE LUFTHANSA AG ISIN #DE0008232 | D1908N106 | 640.000 | SALE | 12/04/08 | 8,156.54 | 0.00 |
| RWE AG NEU ESSEN ISIN #DE0007037129 | D6629K109 | 100.000 | SALE | 12/02/08 | 7,755.30 | 0.00 |
| BNP PARIBAS ORD SHS ISIN #FR0000013110 | F1058Q238 | 90.000 | SALE | 12/02/08 | 4,387.88 | 0.00 |
| TSAKOS ENERGY NAVIGATION LTD ISIN | G9108L108 | 340.000 | SALE | 12/01/08 | 6,353.81 | 0.00 |
| NESTLE SA CHAM ET VEVEY SHS NOM ISIN | H57312649 | 200.000 | SALE | 12/02/08 | 7,039.68 | 0.00 |
| SBI HOLDINGS INC TOKYO SHS ISIN | J6991H100 | 40.000 | SALE | 10/03/08 | 1,128.47 | 0.00 |
| | | 14.000 | SALE | 10/24/08 | 1,732.08 | 0.00 |
| CORIO NV ISIN #NL0000288967 SEDOL | N2273C104 | 60.000 | SALE | 12/02/08 | 2,541.20 | 0.00 |
| EUROCOMMERCIAL PROPERTIES NV CERT OF | N31065142 | 90.000 | SALE | 12/02/08 | 2,725.16 | 0.00 |
| | | 40.000 | SALE | 12/03/08 | 1,220.66 | 0.00 |
| | | 40.000 | SALE | 12/04/08 | 1,286.28 | 0.00 |
| ST GEORGE BK LTD AUD1 ISIN AU000000 | 08757F106 | 60.000 | SALE | 01/29/08 | 1,649.60 | 0.00 |
| | | 10.000 | SALE | 02/05/08 | 251.30 | 0.00 |
| WESTPAC BANK CORP AUD1 ISIN | 087417101 | 0.000 | CASH IN LIEU | 12/04/08 | 8.32 | 0.00 |
| TELENOR AS SHS ISIN #NO0010063308 SED | 21882106 | 30.000 | SALE | 01/25/08 | 626.96 | 0.00 |
| | | 420.000 | SALE | 11/06/08 | 2,521.76 | 0.00 |
| AFRICAN BANK INVESTMENTS LIMITED ISIN | S01035112 | 580.000 | SALE | 08/19/08 | 1,906.40 | 0.00 |
| | | 770.000 | SALE | 12/02/08 | 1,900.59 | 0.00 |
| | | 580.000 | SALE | 12/03/08 | 1,366.36 | 0.00 |
| | | 390.000 | SALE | 12/04/08 | 911.24 | 0.00 |

FIG. 26

| | | | | |
|---|---|---|---|---|
| PT INTERNATIONAL NICKEL INDONESIA INC Y39128148 | 400.000 | SALE | 12/04/08 | 300.66 | 0.00 |
| | 370.000 | SALE | 12/05/08 | 275.35 | 0.00 |
| KUALA LUMPUR KEPONG BHD KLK SHS ISIN Y47153104 | 6,000.000 | SALE | 12/02/08 | 841.89 | 0.00 |
| | 1,100.000 | SALE | 10/22/08 | 2,419.34 | 0.00 |
| K T & G CORP KRW SHS ISIN #KR7003378OO Y49904108 | 170.000 | SALE | 12/02/08 | 8,818.21 | 0.00 |
| | 700.000 | SALE | 12/02/08 | 75.39 | 0.00 |
| ROJANA INDUSTRIAL PARK PUBLIC CO LTD Y7323X121 | 1,200.000 | SALE | 12/03/08 | 127.68 | 0.00 |
| | 1,600.000 | SALE | 12/04/08 | 144.86 | 0.00 |
| | 1,600.000 | SALE | 12/08/08 | 143.34 | 0.00 |
| | 1,600.000 | SALE | 12/09/08 | 143.57 | 0.00 |
| | 300.000 | SALE | 12/11/08 | 26.48 | 0.00 |

*This is important tax information and is being furnished to the Internal Revenue Service. If you are required to file a return, a negligence penalty or other sanction may be imposed on you if this income is taxable and the IRS determines that it has not been reported. Please see the enclosed important instructions.

FIG. 27

| | | | | |
|---|---|---|---|---|
| RWE AG NEU ESSEN ISIN #DE0007037129 D6629K109 | 100.000 | SALE | 12/02/08 | 7,755.30 | 0.00 |
| BNP PARIBAS ORD SHS ISIN #FR000013110 F10580238 | 90.000 | SALE | 12/02/08 | 4,387.88 | 0.00 |
| TSAKOS ENERGY NAVIGATION LTD ISIN G9108L108 | 340.000 | SALE | 12/01/08 | 6,353.81 | 0.00 |
| NESTLE SA CHAM ET VEVEY SHS NOM ISIN H57312649 | 200.000 | SALE | 12/02/08 | 7,039.68 | 0.00 |
| SBI HOLDINGS INC TOKYO SHS ISIN J6991H100 | 8.000 | SALE | 10/03/08 | 1,128.47 | 0.00 |
| CORIO NV ISIN #NL0000288967 SEDOL N2273C104 | 14.000 | SALE | 10/24/08 | 1,732.08 | 0.00 |
| EUROCOMMERCIAL PROPERTIES NV CERT OF N31065 | 60.000 | SALE | 12/02/08 | 2,541.20 | 0.00 |
| | 30.000 | SALE | 12/02/08 | 2,725.16 | 0.00 |
| | 40.000 | SALE | 12/03/08 | 1,220.66 | 0.00 |
| ST GEORGE BK LTD AUD1 ISIN AU000 Q8757F | 40.000 | SALE | 12/04/08 | 1,286.28 | 0.00 |
| | 60.000 | SALE | 01/29/08 | 1,649.60 | 0.00 |
| | 10.000 | SALE | 02/05/08 | 251.30 | 0.00 |
| WESTPAC BANK CORP AUD1 ISIN Q9741T101 | 0.000 | CASH IN LIEU | 12/04/08 | 8.32 | 0.00 |
| TELENOR AS SHS ISIN #NO0010063308 SED 21882106 | 30.000 | SALE | 01/25/08 | 626.96 | 0.00 |

FIG. 28

| Form 1099-B * | 2008 Proceeds from Broker and Barter Exchange Transactions | | | | | OMB NO. 1545-0715 Copy B for Recipient |
|---|---|---|---|---|---|---|
| Description (7) | CUSIP (1b) | Quantity | Event | Date of Sale or Exchange (1a) | Stocks, Bonds, etc (2) $ | Federal Income Tax Withheld (4) |
| DEUTSCHE LUFTHANSA AG ISIN #DE0008232 | D1908N106 | 640.000 | SALE | 12/02/08 | 8,156.54 | 0.00 |
| RWE AG NEU ESSEN ISIN #DE0007037129 | D6629K109 | 100.000 | SALE | 12/02/08 | 7,755.30 | 0.00 |
| BNP PARIBAS ORD SHS ISIN #FR000013110 | F10580238 | 90.000 | SALE | 12/02/08 | 4,387.88 | 0.00 |
| TSAKOS ENERGY NAVIGATION LTD ISIN | G9108L108 | 340.000 | SALE | 12/01/08 | 6,353.81 | 0.00 |
| NESTLE SA CHAM ET VEVEY SHS NOM ISIN | H57312649 | 200.000 | SALE | 12/02/08 | 7,039.68 | 0.00 |
| SBI HOLDINGS INC TOKYO SHS ISIN | J6991H100 | 8.000 | SALE | 10/03/08 | 1,128.47 | 0.00 |
| | | 14.000 | SALE | 10/24/08 | 1,732.08 | 0.00 |
| CORIO NV ISIN #NL0000288967 SEDOL | N2273C104 | 60.000 | SALE | 12/02/08 | 2,541.20 | 0.00 |
| EUROCOMMERCIAL PROPERTIES NV CERT OF | N31065142 | 90.000 | SALE | 12/02/08 | 2,725.16 | 0.00 |
| | | 40.000 | SALE | 12/03/08 | 1,220.66 | 0.00 |
| | | 40.000 | SALE | 12/04/08 | 1,286.28 | 0.00 |
| ST GEORGE BK LTD AUD1 ISIN AU000000S8 | Q8757F106 | 60.000 | SALE | 01/29/08 | 1,649.60 | 0.00 |
| | | 10.000 | SALE | 02/05/08 | 251.30 | 0.00 |
| WESTPAC BANK CORP AUD1 ISIN | Q7417101 | 0.000 | CASH IN LIEU | 12/04/08 | 8.32 | 0.00 |
| TELENOR AS SHS ISIN #NO0010063388 SED | R1882106 | 30.000 | SALE | 01/25/08 | 626.96 | 0.00 |
| | | 420.000 | SALE | 11/06/08 | 2,521.76 | 0.00 |
| AFRICAN BANK INVESTMENTS LIMITED ISIN | S01035112 | 580.000 | SALE | 08/19/08 | 1,906.40 | 0.00 |
| | | 770.000 | SALE | 12/02/08 | 1,900.59 | 0.00 |
| | | 580.000 | SALE | 12/03/08 | 1,366.36 | 0.00 |
| | | 390.000 | SALE | 12/04/08 | 911.24 | 0.00 |
| | | 260.000 | SALE | 12/05/08 | 611.05 | 0.00 |
| PRETORIA PORTLAND CEMENT CO LTD ISIN | S63820112 | 420.000 | SALE | 12/02/08 | 1,174.11 | 0.00 |
| | | 210.000 | SALE | 12/03/08 | 591.26 | 0.00 |
| | | 280.000 | SALE | 12/04/08 | 766.42 | 0.00 |
| | | 390.000 | SALE | 12/05/08 | 1,067.35 | 0.00 |
| TONGAAT HULETT LTD SHS ISIN | S85920130 | 370.000 | SALE | 11/13/08 | 1,928.77 | 0.00 |
| ENEL SPA ISIN #IT0003128367 SEDOL | T3679P115 | 640.000 | SALE | 12/02/08 | 3,519.30 | 0.00 |
| UNCREDITO ITALIAANO SPA GENOVA SHS IS | 195132105 | 1,090.000 | SALE | 12/02/08 | 2,254.77 | 0.00 |
| SANDVIK AB SHS ISIN #SE0000667891 SED | W74857165 | 860.000 | SALE | 12/02/08 | 4,699.56 | 0.00 |
| ASCENDAS REAL ESTATE INVESTMENT TR UN | Y0205X103 | 1,430.000 | SALE | 12/02/08 | 1,245.24 | 0.00 |
| | | 800.000 | SALE | 12/03/08 | 665.44 | 0.00 |
| | | 400.000 | SALE | 12/04/08 | 300.66 | 0.00 |
| | | 370.000 | SALE | 12/05/08 | 275.35 | 0.00 |
| PT INTERNATIONAL NICKEL INDONESIA INC | Y39128148 | 6,000.000 | SALE | 12/02/08 | 841.89 | 0.00 |
| KUALA LUMPUR KEPONG BHD KLK SHS ISIN | Y47153104 | 1,100.000 | SALE | 10/22/08 | 2,419.34 | 0.00 |
| K T & G CORP KRW SHS ISIN #KR70337800 | Y49904108 | 170.000 | SALE | 12/02/08 | 8,818.21 | 0.00 |
| ROJANA INDUSTRIAL PARK PUBLIC CO LTD | Y7323X121 | 700.000 | SALE | 12/02/08 | 75.39 | 0.00 |
| | | 1,200.000 | SALE | 12/03/08 | 127.68 | 0.00 |
| | | 1,600.000 | SALE | 12/04/08 | 144.86 | 0.00 |
| | | 1,600.000 | SALE | 12/08/08 | 143.34 | 0.00 |
| | | 1,600.000 | SALE | 12/09/08 | 143.57 | 0.00 |
| | | 300.000 | SALE | 12/11/08 | 26.48 | 0.00 |

*This is important tax information and is being furnished to the Internal Revenue Service. If you are required to file a return, a negligence penalty or other sanction may be imposed on you if this income is taxable and the IRS determines that it has not been reported. Please see the enclosed important instructions.

FIG. 29

| | | | | | | |
|---|---|---|---|---|---|---|
| DEUTSCHE LUFTHANSA AG ISIN #DE0008232 | D1908N106 | 640.000 | SALE | 12/02/08 | 8,156.54 | 0.00 |
| RWE AG NEU ESSEN ISIN #DE0007037129 | D6629K109 | 100.000 | SALE | 12/02/08 | 7,755.30 | 0.00 |
| BNP PARIBAS ORD SHS ISIN #FR000013110 | F10580236 | 90.000 | SALE | 12/02/08 | 4,387.88 | 0.00 |
| TSAKOS ENERGY NAVIGATION LTD ISIN | G9108L108 | 340.000 | SALE | 12/01/08 | 6,353.81 | 0.00 |
| NESTLE SA CHAM ET VEVEY SHS NOM ISIN | H57312649 | 200.000 | SALE | 12/02/08 | 7,039.68 | 0.00 |
| SBI HOLDINGS INC TOKYO SHS ISIN | J6991H100 | 8.000 | SALE | 10/03/08 | 1,128.47 | 0.00 |
| | | 14.000 | SALE | 10/24/08 | 1,732.08 | 0.00 |
| CORIO NV ISIN #NL0000288967 SEDOL | N2273C104 | 60.000 | SALE | 12/02/08 | 2,541.20 | 0.00 |
| EUROCOMMERCIAL PROPERTIES NV CERT OF | N31065142 | 90.000 | SALE | 12/02/08 | 2,725.16 | 0.00 |
| | | 40.000 | SALE | 12/03/08 | 1,220.66 | 0.00 |
| | | 40.000 | SALE | 12/04/08 | 1,286.28 | 0.00 |
| ST GEORGE BK LTD AUD1 ISIN AU000... | Q8757F108 | 60.000 | SALE | 01/29/08 | 1,649.60 | 0.00 |
| | | 10.000 | SALE | 02/05/08 | 251.30 | 0.00 |
| WESTPAC BANK CORP AUD1 ISIN | Q97417101 | 0.000 | CASH IN LIEU | 12/04/08 | 8.32 | 0.00 |
| TELENOR AS SHS ISIN #NO0010063308 SED | R21882106 | 30.000 | SALE | 01/25/08 | 626.96 | 0.00 |
| | | 420.000 | SALE | 11/06/08 | 2,521.76 | 0.00 |
| AFRICAN BANK INVESTMENTS LIMITED ISIN | S01035112 | 580.000 | SALE | 08/19/08 | 1,906.40 | 0.00 |
| | | 770.000 | SALE | 12/02/08 | 1,900.59 | 0.00 |
| | | 580.000 | SALE | 12/03/08 | 1,366.36 | 0.00 |
| | | 390.000 | SALE | 12/04/08 | 911.24 | 0.00 |
| | | 260.000 | SALE | 12/05/08 | 611.05 | 0.00 |
| PRETORIA PORTLAND CEMENT CO LTD ISIN | S63820112 | 420.000 | SALE | 12/02/08 | 1,174.11 | 0.00 |
| | | 210.000 | SALE | 12/03/08 | 591.26 | 0.00 |
| | | 280.000 | SALE | 12/04/08 | 766.42 | 0.00 |
| | | 390.000 | SALE | 12/05/08 | 1,067.35 | 0.00 |
| TONGAAT HULETT LTD SHS ISIN | S85920130 | 370.000 | SALE | 11/13/08 | 1,928.77 | 0.00 |
| ENEL SPA ISIN #IT0003128367 SEDOL | T3679P115 | 640.000 | SALE | 12/02/08 | 3,519.30 | 0.00 |
| UNCREDITO ITALIAANO SPA GENOVA SHS IS | T95132105 | 1,090.000 | SALE | 12/02/08 | 2,254.77 | 0.00 |
| SANDVIK AB SHS ISIN #SE0000667891 SED | W74857165 | 860.000 | SALE | 12/02/08 | 4,699.56 | 0.00 |
| ASCENDAS REAL ESTATE INVESTMENT TR UN | Y0205X103 | 1,430.000 | SALE | 12/02/08 | 1,245.24 | 0.00 |
| | | 800.000 | SALE | 12/03/08 | 665.44 | 0.00 |
| | | 400.000 | SALE | 12/04/08 | 300.66 | 0.00 |
| | | 370.000 | SALE | 12/05/08 | 275.35 | 0.00 |
| PT INTERNATIONAL NICKEL INDONESIA INC | Y39128148 | 6,000.000 | SALE | 12/02/08 | 841.89 | 0.00 |
| KUALA LUMPUR KEPONG BHD KLK SHS ISIN | Y47153104 | 1,100.000 | SALE | 10/22/08 | 2,419.34 | 0.00 |
| K T & G CORP KRW SHS ISIN #KR70337800 | Y49904108 | 170.000 | SALE | 12/02/08 | 8,818.21 | 0.00 |
| ROJANA INDUSTRIAL PARK PUBLIC CO LTD | Y7323X121 | 700.000 | SALE | 12/02/08 | 75.39 | 0.00 |
| | | 1,200.000 | SALE | 12/03/08 | 127.68 | 0.00 |
| | | 1,600.000 | SALE | 12/04/08 | 144.86 | 0.00 |
| | | 1,600.000 | SALE | 12/08/08 | 143.34 | 0.00 |
| | | 1,600.000 | SALE | 12/09/08 | 143.57 | 0.00 |
| | | 300.000 | SALE | 12/11/08 | 26.48 | 0.00 |

FIG. 30

Form 1099-B *

2008 Proceeds from Broker and Barter Exchange Transactions

OMB NO. 1545-0715
Copy B for Recipient

| Description (7) | CUSIP (1b) | Quantity | Event | Date of Sale or Exchange (1a) | Stocks, Bonds, etc (2) $ | Federal Income Tax Withheld (4) |
|---|---|---|---|---|---|---|
| DEUTSCHE LUFTHANSA AG ISIN #DE0008232 | D1908N106 | 640.000 | SALE | 12/02/08 | 8,156.54 | 0.00 |
| RWE AG NEU ESSEN ISIN #DE0007037129 | D6629K109 | 100.000 | SALE | 12/02/08 | 7,755.30 | 0.00 |
| BNP PARIBAS ORD SHS ISIN #FR0000013110 | F1058Q238 | 90.000 | SALE | 12/02/08 | 4,387.88 | 0.00 |
| TSAKOS ENERGY NAVIGATION LTD ISIN | G9108L108 | 340.000 | SALE | 12/01/08 | 6,353.81 | 0.00 |
| NESTLE SA CHAM ET VEVEY SHS NOM ISIN | H57312649 | 200.000 | SALE | 12/02/08 | 7,039.68 | 0.00 |
| SBI HOLDINGS INC TOKYO SHS ISIN | J6991H100 | | SALE | 10/03/08 | 1,128.47 | 0.00 |
| | | 14.000 | SALE | 10/24/08 | 1,732.08 | 0.00 |
| CORIO NV ISIN #NL0000288967 SEDOL | N2273C104 | 60.000 | SALE | 12/02/08 | 2,541.20 | 0.00 |
| EUROCOMMERCIAL PROPERTIES NV CERT OF | N31065140 | 90.000 | SALE | 12/02/08 | 2,725.16 | 0.00 |
| | | 40.000 | SALE | 12/03/08 | 1,220.66 | 0.00 |
| | | 40.000 | SALE | 12/04/08 | 1,286.28 | 0.00 |
| ST GEORGE BK LTD AUD1 ISIN AU000 | Q8757F106 | 60.000 | SALE | 01/29/08 | 1,649.60 | 0.00 |
| | | 10.000 | SALE | 02/05/08 | 251.30 | 0.00 |
| WESTPAC BANK CORP AUD1 ISIN | 961417101 | 0.000 | CASH IN LIEU | 12/04/08 | 8.32 | 0.00 |
| TELENOR AS SHS ISIN #NO0010063308 SED | R1882106 | 30.000 | SALE | 01/25/08 | 626.96 | 0.00 |
| | | 420.000 | SALE | 11/06/08 | 2,521.76 | 0.00 |
| AFRICAN BANK INVESTMENTS LIMITED ISIN | S0103511Z | 580.000 | SALE | 08/19/08 | 1,906.40 | 0.00 |

FIG. 31

| Reference Number | Quantity | Security Description | Opening Trade Date | Closing Trade Date | Sale Proceeds | Cost | (Loss) | Gain |
|---|---|---|---|---|---|---|---|---|
| 125000020 | 145 | Company A<br>123 Company Street<br>Town, ST 12345 | 09/26/08 | 01/31/12 | $11,205.66 | $7,417.35 | | $3,786.31 |
| 125000030 | 410 | Company B<br>456 Company Street<br>Town, ST 12345 | 09/14/09 | 02/01/12 | 21,299.26 | 17,517.00 | | 3,782.26 |
| 125000040 | 75 | Company C<br>789 Company Street<br>Town, ST 12345 | 10/02/08 | 02/17/12 | 8,511.03 | 4,030.82 | | 4,460.21 |
| 125000050 | 45 | Company D<br>132 Company Street<br>Town, ST 12345 | 06/01/09 | 02/17/12 | 3,3679.96 | 1,267.19 | | 2,100.77 |
| 125000060 | 60 | Company E<br>879 Company Street<br>Town, ST 12345 | 04/06/09 | 02/17/12 | 3,958.78 | 1,748.98 | | 2,209.80 |
| 125000070 | 195 | Company F<br>546 Company Street<br>Town, ST 12345 | 05/07/10 | 03/26/12 | 10,025.42 | 9,411.04 | | 614.36 |
| 125000080 | 35 | Company E<br>654 Company Street<br>Town, ST 12345 | 09/27/07 | 02/17/12 | 670.69 | 1,445.65 | (777.96) | |
| 125000090 | 220 | Company F<br>987 Company Street<br>Town, ST 12345 | 03/06/09 | 02/17/12 | 8,211.61 | 4,714.27 | | 3,497.34 |

FIG. 32

Form 1099-OID

☐ CORRECTED (if checked)

| PAYER'S name, street address, city, state, ZIP code, and telephone no. | 1 Original issue discount for 2009* | OMB No. 1545-0117 | Original Issue Discount |
|---|---|---|---|
| The Bank of New York Mellon<br>State of Israel<br>111 Sanders Creek Parkway<br>East Syracuse, NY 13057 | $ 378.78<br>2 Other periodic interest<br>$ | 2009<br>Form 1099-OID | |

| PAYER'S federal identification number | RECIPIENT'S identification number | 3 Early withdrawal penalty | 4 Federal income tax withheld | Copy B |
|---|---|---|---|---|
| 13-5160382 | 432-10-9876 | $ | $ | For Recipient |

| RECIPIENT'S name | 5 Description | | This is important tax information and is being furnished to the Internal Revenue Service. If you are required to file a return, a negligence penalty or other sanction may be imposed on you if this income is taxable and the IRS determines that it has not been reported. |
|---|---|---|---|
| John Smith | | | |
| Street address (including apt. no.) | 6 Original issue discount on U.S. Treasury obligations* | | |
| 1 Tech Drive | $ | | |
| City, state, and ZIP code | 7 Investment expenses | | |
| Andover, MA 01810 | $ | | |
| Account number (see instructions) | * This may not be the correct figure to report on your income tax return. See instructions on the back. | | |

Form 1099-OID  (keep for your records)  Department of the Treasury - Internal Revenue Service

---

☐ CORRECTED (if checked)

| PAYER'S name, street address, city, state, ZIP code, and telephone no. | 1 Unemployment compensation | OMB No. 1545-0120 | Certain Government Payments |
|---|---|---|---|
| Government of the District of Columbia<br>Office of the Chief Financial Officer<br>Office of Tax and Revenue<br>941 North Capitol Street, NE<br>Washington, DC 200002 | $<br>2 State or local income tax refunds, credits, or offsets<br>$ 63.11 | 2009<br>Form 1099-G | |

| PAYER'S federal identification number | RECIPIENT'S identification number | 3 Box 2 amount is for tax year | 4 Federal income tax withheld | Copy B |
|---|---|---|---|---|
| 53-6001131 | 432-10-9876 | 2007 | $ | For Recipient |

| RECIPIENT'S name | 5 ATAA payments | 6 Taxable grants | This is important tax information and is being furnished to the Internal Revenue Service. If you are required to file a return, a negligence penalty or other sanction may be imposed on you if this income is taxable and the IRS determines that it has not been reported. |
|---|---|---|---|
| John Smith | $ | $ | |
| Street address (including apt. no.) | 7 Agriculture payments | 8 Box 2 is trade or business income ▶ ☐ | |
| 1 Tech Drive | $ | | |
| City, state, and ZIP code | 9 Market gain | | |
| Andover, MA 01810 | $ | | |
| Account number (see instructions) | | | |

Form 1099-G  (keep for your records)  Department of the Treasury - Internal Revenue Service

FIG. 35

| Proforma | |
|---|---|
| Tax Payer Name | John Smith |
| Social Security Number | 432-10-9876 |
| Tax Year | 2006 |
| ... | |

FIG. 36

| ☐ CORRECTED (if checked) | | |
|---|---|---|
| PAYER'S... <br> Government of the District of Columbia <br> Office of the Chief Financial Officer <br> Office of Tax and Revenue <br> 941 North Capitol Street, NE <br> Washington, DC 200002 | 1 Unemployment compensation <br> $ | OMB No. 1545-0120 <br> 2009 <br> Form 1099-G | Certain Government Payments |
| | 2 State or local income tax refunds, credits, or offsets <br> $ 63.11 | | |
| PAYER'S federal identification number <br> 53-6001131 | RECIPIENT'S identification number <br> 432-10-9876 | 3 Box 2 amount is for tax year <br> 2007 | 4 Federal income tax withheld <br> $ | Copy B <br> For Recipient |
| RECIPIENT'S name <br> John Smith | | 5 ATAA payments <br> | 6 Taxable grants <br> $ | This is important tax information and is being furnished to the Internal Revenue Service. If you are required to file a return, a negligence penalty or other sanction may be imposed on you if this income is taxable and the IRS determines that it has not been reported. |
| Street address (including apt. no.) <br> 1 Tech Drive | | 7 Agriculture payments <br> $ | 8 Box 2 is trade or business income ▲ ☐ | |
| City, state, and ZIP code <br> Andover, MA 01810 | | 9 Market gain <br> $ | | |
| Account number (see instructions) | | | | |

Form 1099-G (keep for your records) Department of the Treasury - Internal Revenue Service

FIG. 37

| Label | Value |
|---|---|
| Payer's federal identification number | 53-6001131 |
| Recipient's identification number | 432-10-9876 |
| Recipient's name | John Smith |
| State or local income tax refund | 63.11 |
| Tax year | 2007 |

| Label | Value |
|---|---|
| Employee's social security number | 432-10-9876 |
| Employer's identification number | 04-3298713 |
| Employer's name, address, and ZIP code | D. Rock, Inc.<br>P.O. Box 435<br>Amesbury, MA 01913 |
| Employee's name and address | John Smith<br>1 Tech Drive<br>Andover, MA 01810 |
| Tax year | 2009 |
| Wages, tips and other compensation | 9060.83 |
| ... | |

FIG. 40

| 1 Wages, tips, other compensation ☐,060.☐3 | 2 Federal income tax withheld 106.11 |
|---|---|
| 3 Social security wages ☐060.☐3 | 4 Social security tax withheld 561.☐3 |
| 5 Medicare wages and tips ☐060.☐3 | 6 Medicare tax withheld 131.52 |

FIG. 41

PAYER'S name, street address, city, state, ZIPcode, and telephone no.

1 Original issue discount for 2009*

PAYER'S ederal identification number

RECIPIENT'S identification number

RECIPIENT'S identification number

RECIPIENT'S name

Street address (including apt. no.)

City, state, and ZIP code

FIG. 44

| QUANTITY | DESCRIPTION | OPEN DATE | NET COST | CLOSE DATE | NET PROCEEDS | REALIZED GAIN/LOSS |
|---|---|---|---|---|---|---|
| 30,000.000 | COMERICA BK DALLAS TEX C/D FDIC INS TO LIMITS 3.450% DUE 07/15/2009 CUSIP: 200339CS6 | 10/09/08 | 30,000.00 | 07/15/09 | 30,000.00 | 0.00 |
| 4,000.000 | GENERAL ELEC CAP CORP INTERNOTES 2.850% DUE 04/15/2009 CUSIP: 36966RNT9 | 04/30/08 | 3,990.44 | 04/15/09 | 4,000.00 | 9.56 |
| 5,000.000 | LEHMAN BROS BK FSB WILMINGTON DEL C/D FDIC INS TO LIMITS 3.500% DUE 03/03/2009 CUSIP: 52519C6U7 | 04/28/08 | 4,989.20 | 03/04/09 | 5,000.00 | 10.80 |
| 9,000.000 | MIDDLEBURG NATL BK VA C/D FDIC INS TO LIMITS 3.250% DUE 02/23/2009 CUSIP: 596131AN2 | 05/12/08 | 9,000.00 | 02/23/09 | 9,000.00 | 0.00 |

FIG. 45

| QUANTITY | DESCRIPTION | OPEN DATE | NET COST | CLOSE DATE | NET PROCEEDS | REALIZED GAIN/LOSS |
|---|---|---|---|---|---|---|
| 30,000.000 | COMERICA BK DALLAS TEX<br>C/D FDIC INS TO LIMITS<br>3.450% DUE 07/15/2009<br>CUSIP: 200339CS6 | 10/09/08 | 30,000.00 | 07/15/09 | 30,000.00 | 0.00 |
| 4,000.000 | GENERAL ELEC CAP CORP<br>INTERNOTES<br>2.850% DUE 04/15/2009<br>CUSIP: 36966RNT9 | 04/30/08 | 3,990.44 | 04/15/09 | 4,000.00 | 9.56 |
| 5,000.000 | LEHMAN BROS BK FSB WILMINGTON<br>DEL C/D FDIC INS TO LIMITS<br>3.500% DUE 03/03/2009<br>CUSIP: 52519C6U7 | 04/28/08 | 4,989.20 | 03/04/09 | 5,000.00 | 10.80 |
| 9,000.000 | MIDDLEBURG NATL BK VA<br>C/D FDIC INS TO LIMITS<br>3.250% DUE 02/23/2009<br>CUSIP: 596131AN2 | 05/12/08 | 9,000.00 | 02/23/09 | 9,000.00 | 0.00 |

FIG. 46

| QUANTITY | DESCRIPTION | OPEN DATE | NET COST | CLOSE DATE | NET PROCEEDS | REALIZED GAIN/LOSS |
|---|---|---|---|---|---|---|
| 30,000.000 | COMERICA BK DALLAS TEX<br>C/D FDIC INS TO LIMITS<br>3.450% DUE 07/15/2009<br>CUSIP: 200339CS6 | 10/09/08 | 30,000.00 | 07/15/09 | 30,000.00 | 0.00 |
| 4,000.000 | GENERAL ELEC CAP CORP<br>INTERNOTES<br>2.850% DUE 04/15/2009<br>CUSIP: 36966RNT9 | 04/30/08 | 3,990.44 | 04/15/09 | 4,000.00 | 9.56 |
| 5,000.000 | LEHMAN BROS BK FSB WILMINGTON<br>DEL C/D FDIC INS TO LIMITS<br>3.500% DUE 03/03/2009<br>CUSIP: 52519C6U7 | 04/28/08 | 4,989.20 | 03/04/09 | 5,000.00 | 10.80 |
| 9,000.000 | MIDDLEBURG NATL BK VA<br>C/D FDIC INS TO LIMITS<br>3.250% DUE 02/23/2009<br>CUSIP: 596131AN2 | 05/12/08 | 9,000.00 | 02/23/09 | 9,000.00 | 0.00 |

FIG. 47

| QUANTITY | DESCRIPTION | OPEN DATE | NET COST | CLOSE DATE | NET PROCEEDS | REALIZED GAIN/LOSS |
|---|---|---|---|---|---|---|
| 30,000.000 | COMERICA BK DALLAS TEX<br>C/D FDIC INS TO LIMITS<br>3.450% DUE 07/15/2009<br>CUSIP: 200339CS6 | 10/09/08 | 30,000.00 | 07/15/09 | 30,000.00 | 0.00 |
| 4,000.000 | GENERAL ELEC CAP CORP<br>INTERNOTES<br>2.850% DUE 04/15/2009<br>CUSIP: 36966RNT9 | 04/30/08 | 3,990.44 | 04/15/09 | 4,000.00 | 9.56 |
| 5,000.000 | LEHMAN BROS BK FSB WILMINGTON<br>DEL C/D FDIC INS TO LIMITS<br>3.500% DUE 03/03/2009<br>CUSIP: 52519C6U7 | 04/28/08 | 4,989.20 | 03/04/09 | 5,000.00 | 10.80 |
| 9,000.000 | MIDDLEBURG NATL BK VA<br>C/D FDIC INS TO LIMITS<br>3.250% DUE 02/23/2009<br>CUSIP: 596131AN2 | 05/12/08 | 9,000.00 | 02/23/09 | 9,000.00 | 0.00 |

FIG. 48

| QUANTITY | DESCRIPTION | OPEN DATE | NET COST | CLOSE DATE | NET PROCEEDS | REALIZED GAIN/LOSS |
|---|---|---|---|---|---|---|
| 30,000.000 | COMERICA BK DALLAS TEX<br>C/D FDIC INS TO LIMITS<br>3.450% DUE 07/15/2009<br>CUSIP: 200339CS6 | 10/09/08 | 30,000.00 | 07/15/09 | 30,000.00 | 0.00 |
| 4,000.000 | GENERAL ELEC CAP CORP<br>INTERNOTES<br>2.850% DUE 04/15/2009<br>CUSIP: 36966RNT9 | 04/30/08 | 3,990.44 | 04/15/09 | 4,000.00 | 9.56 |
| 5,000.000 | LEHMAN BROS BK FSB WILMINGTON<br>DEL C/D FDIC INS TO LIMITS<br>3.500% DUE 03/03/2009<br>CUSIP: 52519C6U7 | 04/28/08 | 4,989.20 | 03/04/09 | 5,000.00 | 10.80 |
| 9,000.000 | MIDDLEBURG NATL BK VA<br>C/D FDIC INS TO LIMITS<br>3.250% DUE 02/23/2009<br>CUSIP: 596131AN2 | 05/12/08 | 9,000.00 | 02/23/09 | 9,000.00 | 0.00 |

FIG. 49

| 1 Wages, tips, other comp. 555642.23 | 1 Wages, tips, other comp. | 1 Wages, tips, other comp. 42.23 | 1 Wages, tips, other comp. 555642.23 |

FIG. 50

| Record | Label | Value |
|---|---|---|
| 1 | Wages, tips, other comp. | 555642.23 |
| 2 | Wages, tips, other comp. | |
| 3 | Wages, tips, other comp. | 42.23 |
| 4 | Wages, tips, other comp. | 555642.23 |

FIG. 51

SYSTEMS AND METHODS FOR AUTOMATICALLY PROCESSING ELECTRONIC DOCUMENTS USING MULTIPLE IMAGE TRANSFORMATION ALGORITHMS

CROSS REFERENCE TO RELATED APPLICATIONS

This application claims the benefit under 35 U.S.C. §119(e) of U.S. Provisional Patent Application No. 61/295,210, filed Jan. 15, 2010, which is hereby incorporated by reference herein in its entirety.

This application is also related to the following applications filed concurrently herewith on Jan. 14, 2011:

U.S. patent application Ser. No. 13/007,430, entitled "Systems and methods for training document analysis system for automatically extracting data from documents;"

U.S. patent application Ser. No. 13/007,443, entitled "Systems and methods for automatically extracting data from electronic documents containing multiple layout features;"

U.S. patent application Ser. No. 13/007,422, entitled "Systems and methods for automatically extracting data from electronic documents using external data;"

U.S. patent application Ser. No. 13/007,399, entitled "Systems and methods for automatically correcting data extracted from electronic documents using known constraints for semantics of extracted data elements;"

U.S. patent application Ser. No. 13/007,407, entitled "Systems and methods for automatically reducing data search space and improving data extraction accuracy using known constraints in a layout of extracted data elements;"

U.S. patent application Ser. No. 13/007,434, entitled "Systems and methods for automatically extracting data from electronic documents using multiple character recognition engines;"

U.S. patent application Ser. No. 13/007,466, entitled "Systems and methods for automatically extracting data by narrowing data search scope using contour matching;"

U.S. patent application Ser. No. 13/007,330, entitled "Systems and methods for automatically extracting data from electronic document page including multiple copies of a form;" and U.S. patent application Ser. No. 13/007,481, entitled "Systems and methods for automatically grouping electronic document pages."

FIELD OF THE INVENTION

This invention relates generally to systems and methods to extract data from electronic documents, and more particularly to systems and methods for automatically processing electronic documents using multiple image transformation algorithms.

BACKGROUND

Millions of documents are produced every day that are reviewed, processed, stored, audited and transformed into computer-readable data. Examples include accounts payable, collections, educational forms, financial statements, government documents, human resource records, insurance claims, legal papers, medical records, mortgages, nonprofit reports, payroll records, shipping documents and tax forms.

These documents generally require data to be extracted in order to be processed. Data extraction can be primarily clerical in nature, such as in inputting information on customer survey forms. Data extraction can also be an essential portion of larger technical tasks, such as preparing income tax returns, processing healthcare records or handling insurance claims.

Various techniques, such as Electronic Data Interchange (EDI,) attempt to eliminate human processing efforts by coding and transmitting the document information in strictly formatted messages. Electronic Data Interchange is known for custom computer systems, cumbersome software and bloated standards that defeated its rapid spread throughout the supply chain. Perceived as too expensive, the vast majority of businesses have avoided implementing EDI. Similarly, applications of XML, XBRL and other computer-readable document files are quite limited compared to the use of documents in paper and digital image formats (such as PDF and TIFF.)

Ideally, these documents would be capable of being both read by people and automatically processed by computers. Since paper and digital image files comprise an overwhelming percentage of all documents, it would be most practical to train computers to extract data from human-readable documents.

To date, there have been three general methods of performing data extraction on documents: conventional, outsourcing and automation.

Conventional data extraction, the first method, requires workers with specific education, domain expertise, particular training, software knowledge and/or cultural understanding. Data extraction workers must recognize documents, identify and extract relevant information on the documents and enter the data appropriately and accurately in particular software programs. Such manual data extraction is complex, time-consuming and error-prone. As a result, the cost of data extraction is often quite high; numerous studies estimate the cost of processing invoices in excess of ten dollars each. The cost is especially high when the data extraction is performed by accountants, lawyers, physicians and other highly paid professionals as part of their work. For example, professional tax preparers report spending hours on each client tax return transcribing salary, interest, dividend and capital gains data; they also admit to human data extraction/entry accuracies of less than 90%.

Conventional data extraction also exposes all documents in their entirety to data extraction workers. These documents may have sensitive information related to individuals' and organizations' education, employment, family, financial, health, insurance, legal, tax, and/or other matters.

Whereas conventional data extraction is entirely paper-based, outsourcing and automation begin by converting paper to digital image files. This step is straightforward, aided by high quality, fast, affordable scanners that are available from many vendors including Bell+Howell, Canon, Epson, Fujitsu, Kodak, Panasonic and Xerox.

Once paper documents are converted to digital image files, document processing can be made more productive through the use of workflow software that routes the documents to the lowest-cost labor available, either in-house or outsourced, on-shore or overseas. Primary processing can be done by junior personnel; exceptions can be handled by more highly trained people. Despite the potential productivity gains that are enabled with workflow software in the form improved labor utilization, manual document processing remains a fundamentally expensive process.

Outsourcing, the second method of data extraction, requires the same worker education, expertise, training, software knowledge and/or cultural understanding. As with conventional data extraction, outsourced data extraction workers must recognize documents, find relevant information on the documents, extract and enter the data appropriately and accurately in particular software programs. Since outsourcing is manual, just as is conventional data extraction, it is also complex, time-consuming and error-prone. Outsourcing firms such as Accenture, Datamatics, Hewlett Packard, IBM, Infosys, Tata, and Wipro, often reduce costs by offshoring data extraction work to locations with low wage data extraction workers. For example, extraction of data from US tax and financial documents is a function that has been implemented using thousands of well-educated, English-speaking workers in India and other low wage countries.

The first step of outsourcing requires organizations to scan financial, health, tax and/or other documents and save the resulting image files. These image files can be accessed by data extraction workers via several methods. One method stores the image files on the source organizations' computer systems; the data extraction workers view the image files over networks (such as the Internet or private networks.) Another method stores the image files on third-party computers systems; the data extraction workers view the image files over networks. An alternative method transmits the image files from source organizations over networks and stores the image files for viewing by the data extraction workers on the data extraction organizations' computer system.

For example, an accountant may scan the various tax forms containing client financial data and transmit the scanned image files to an outsourcing firm. An employee of the outsourcing firm extracts the client financial data and enters it into an income tax software program. The resulting tax software data file is then transmitted back to the accountant.

Quality problems with offshore data extraction work have been reported by many customers. Outsourced service providers address these problems by hiring better educated and/or more experienced workers, providing them more extensive training, extracting and entering data two or more times and/or exhaustively checking their work for quality errors. These measures reduce the cost savings expected from offshore outsourcing.

Outsourcing and offshoring are accompanied with concerns over security risks associated with fraud and identity theft. These security concerns apply to employees and temporary workers as well as outsourced workers and offshore workers who have access to documents with sensitive information.

Although the transmission of scanned image files to the data extraction organization may be secured by cryptographic techniques, the sensitive data and personal identifying information are in the clear, i.e., unencrypted, when read by data extraction workers prior to entry in the appropriate computer systems. Data extraction organizations publicly recognize the need for information security. Some data extraction organizations claim to investigate and perform background checks of employees. Many data extraction organizations claim to strictly limit physical access to the rooms in which the employees enter the data; further, such rooms may be isolated. Paper, writing materials, cameras or other recording technology may be forbidden in the rooms. Additionally, employees may be subject to inspection to ensure that nothing is copied or removed. Since such seemingly comprehensive security precautions are primarily physical in nature, they are imperfect.

Because of these imperfections, lapses in physical security have occurred. For example, Social Security Numbers and bank routing numbers are only nine digits; bank account numbers are usually of similar length. Memorizing these important numbers would not be difficult and would allow a nefarious employee to have direct access to the money held in those accounts. For example, in 2004 employees of MphasiS in Pune, India allegedly stole $426,000 from Citibank customers. The owners, managers, staff, guards and contractors of data extraction organizations may misuse some or all of the unencrypted confidential information in their care. Further, breaches of physical and information system security by external parties can occur. Because data extraction organizations are increasingly located in foreign countries, there is often little or no recourse for American citizens victimized in this manner.

Information security has been the identified for seven consecutive years as the most important technology initiative by the Top Technology Initiatives survey of the American Institute of Certified Public Accountants (AICPA.) National and state laws have been enacted and new regulations have been implemented to address these security concerns, particularly those related to outsourced data extraction that is performed offshore.

The third general method of data extraction involves partial automation, often combining optical character recognition, human inspection and workflow management software.

Software tools that facilitate the automated extraction and transformation of document information are available from several vendors including ABBYY, AnyDoc Software, EMC Captiva, Kofax and Nuance. The relative operating cost savings facilitated by these tools is proportional to the amount of automation, which depends on the application, quality of software customization, variety and quality of documents and other factors.

Automation requires customizing and/or programming data extraction software tools to properly recognize and process a specific set of documents for a specific domain. Because such customization projects often cost upwards of hundreds of thousands of dollars, data extraction automation is usually limited to large organizations that can afford significant capital investments.

The first step of a partially automated data extraction operation is to scan financial, health, tax and/or other documents and save the resulting image files. The scanned images are compared to a database of known documents. Images that are not identified are routed to data extraction workers for conventional processing. Images that are identified have data extracted using templates, either location-based or label-based, along with optical character recognition (OCR) technology.

Optical character recognition is imperfect, often mistaking more than one percent of the characters on clean, high quality documents. Many documents are neither clean nor high quality, suffering from being folded or marred before scanning, distorted during scanning and degraded during post-scanning binarization. As a result, some of the labels needed to identify data are often not recognizable; therefore, some of the data cannot be automatically extracted.

Using conventional software tools, vendors report being able to extract up to 80-90% of the data on a limited number of typical forms. When a wide range of forms exists, such as the 10,000 plus variations of W-2, 1099, K-1 and other personal income tax forms, automated data extraction is quite limited. Despite years of efforts, several tax document automation vendors claim 50% or less data extraction and admit to numerous errors with conventional data extraction methods.

Correcting errors entails human inspection. Inspection requires workers with the same capabilities of data extraction workers, namely specific education, domain expertise, particular training, software knowledge and/or cultural understanding. Inspection workers must recognize documents, find relevant information on the documents and insure that the data has been accurately extracted and appropriately entered in particular software programs. Typically, any changes made by inspection workers must be reviewed and approved by other, more senior, inspection workers before replacing the data extracted by optical character recognition. Because automation requires human inspection, source documents with sensitive information are exposed in their entirety to data extraction workers.

SUMMARY OF INVENTION

The invention is directed to systems and methods for automatically processing electronic documents using multiple image transformation algorithms.

In a preferred embodiment, a method in a document analysis system, which receives and processes jobs from a plurality of users, in which each job may contain multiple electronic documents, to extract data from the electronic documents, is provided. The method automatically pre-processes each received electronic document using a plurality of image transformation algorithms to improve subsequent data extraction from said document. The method includes: electronically partitioning each received electronic document page into pieces; automatically processing each piece of the received electronic document page using each of a plurality of image pre-processing algorithms to produce a plurality of image variations of each piece; and analyzing the outputs of subsequent processing and data extraction, on each of the image variations of the pieces to determine which output is best, from the plurality of outputs for each piece.

BRIEF DESCRIPTION OF THE DRAWINGS

The invention is illustrated in the figures of the accompanying drawings which are meant to be exemplary and not limiting, in which like references are intended to refer to like or corresponding part, and in which:

FIG. 11 is an illustration of image processing prior to OCR according to a preferred embodiment of the disclosed subject matter;

FIG. 17 is an illustration of relative location matching of labels according to a preferred embodiment of the disclosed subject matter;

FIG. 19 is an illustration of boxes containing labels and values;

FIG. 20 is an illustration of check boxes;

FIG. 21 is an illustration of address blocks;

FIG. 22 is an illustration of an instruction block;

FIG. 23 is an illustration of a table;

FIG. 25 is an illustration of an image with (A) confetti, (B) confetti with identified labels and (C) confetti with identified labels and labels with potential table headers grouped horizontally;

FIG. 26 is an illustration of a table with a header that needs reconstruction;

FIG. 27 is an illustration of a table with an instruction block at the bottom;

FIG. 28 is an illustration of a portion of a table with noise removed and most data correctly extracted;

FIG. 29 is an illustration of row formation in a table;

FIG. 30 is an illustration of column formation in a table;

FIG. 31 is an illustration of header association for a table;

FIG. 32 is an illustration of a table with extracted data viewed through a debug tool; note the incorrectly formed rows due to the "Corrected" overlay. Rows 1, 2, 3, 5, 6, 7, 8, and 9 are merged, but row 4 and the rest of the table was extracted properly;

FIG. 35 is an illustration of the an image being extracted via a process of progressive refinement based on utilizing knowledge gained from one form to extract data from another form;

FIG. 36 is an illustration of data external to the input image that is used to extract and verify data from the input image;

FIG. 37 is an illustration of a form with an obscured label;

FIG. 38 is an illustration of the data extracted from the form shown in FIG. 37;

FIG. 39 is an illustration of a form with a degraded image that results in incorrectly extracted data;

FIG. 40 is an illustration of the data extracted from the form shown in FIG. 39;

FIG. 41 is an illustration of a portion of a W-2 form;

FIG. 44 is an illustration of the labels associated with a 1099-OID form;

FIG. 45 is an illustration of a table;

FIG. 46 is an illustration of the table shown in FIG. 45 with columns identified;

FIG. 47 is an illustration of the table shown in FIG. 45 with columns and labels identified;

FIG. 48 is an illustration of the table shown in FIG. 45 with columns, labels and header identified;

FIG. 49 is an illustration of the table shown in FIG. 45 with columns, labels, header and rows identified;

FIG. 50 is an illustration of four occurrences of image fields for "Wages, tips, other comp." box on a single W-2 form;

FIG. 51 is an illustration of the data records corresponding to the image fields shown in FIG. 50.

DETAILED DESCRIPTION

While the prior art attempts to reduce the cost of data extraction through the use of low cost labor and partial automation, none of the above methods of data extraction (1) eliminates the human labor and its accompanying requirements of education, domain expertise, training, software knowledge and/or cultural understanding, (2) minimizes the time spent entering and quality checking the data, (3) minimizes errors, (4) protects the privacy of the owners of the data without being dependent on the security systems of data extraction organizations and (5) eliminates the cost for significant up-front engineering efforts. What is needed, therefore, is a method of performing data extraction that overcomes the above-mentioned limitations and that includes the features enumerated above.

Preferred embodiments of the present invention provides a method and system for extracting data from paper and digital documents into a format that is searchable, editable and manageable.

Figure 1:
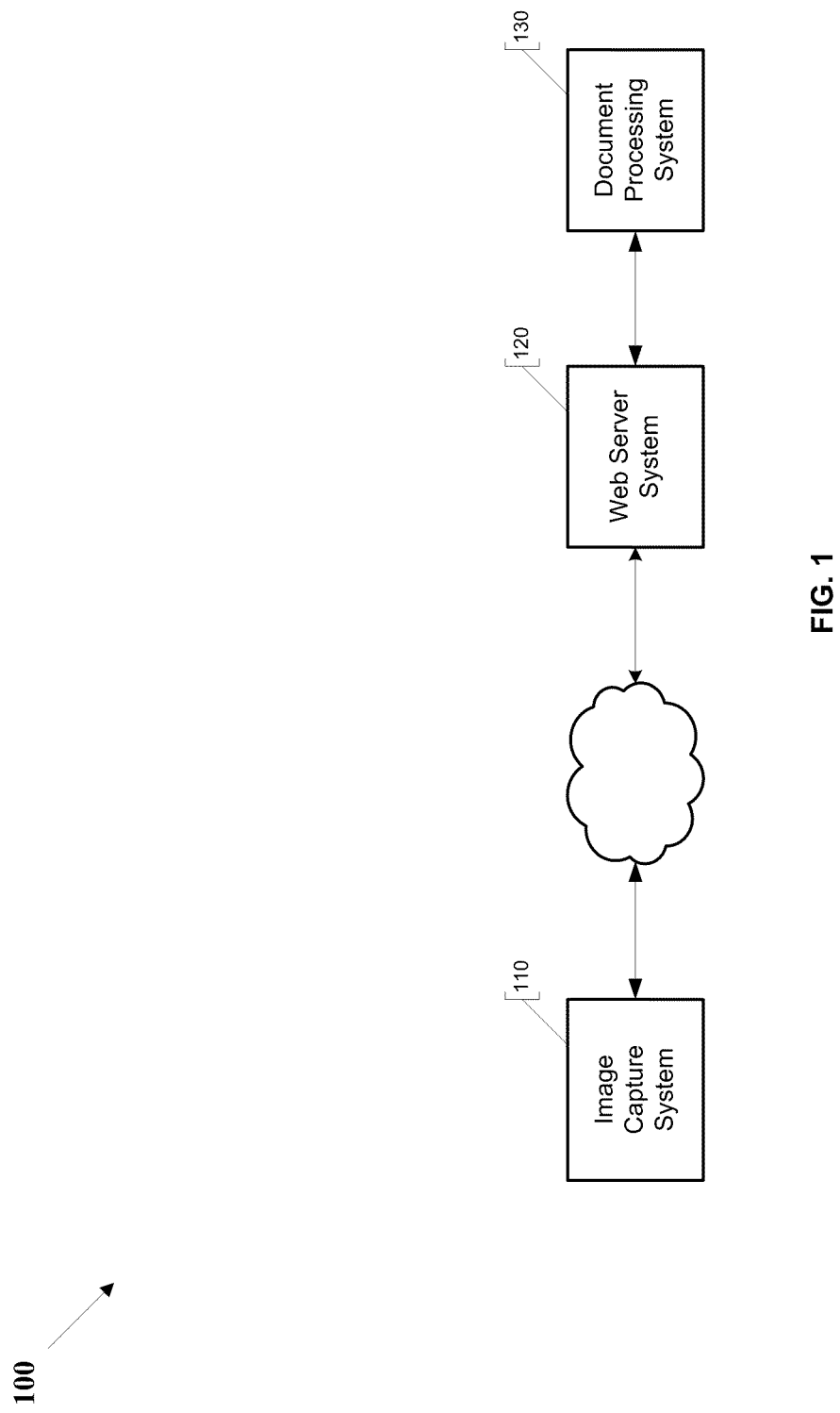
FIG. 1 is a system diagram of a document data extraction system 100 according to a preferred embodiment of the disclosed subject matter.

FIG. 1 is a system diagram of a document data extraction system 100 according to a preferred embodiment of the invention. System 100 has an image capture system 110, and a web server system 120 and a document processing system 130. In the preferred embodiment, the image capture system 110 is connected to the web server system 120 by a network such as a local-area network (LAN,) a wide-area network (WAN) or the Internet. The preferred implementation transfers all data over the network using Secure Sockets Layer (SSL) technology with enhanced 128-bit encryption. Encryption certificates can be purchased from well respected certificate authorities such as VeriSign and thawte or can be generated by using numerous key generation tools in the market today, many of which are available as open source. Alternatively, the files may be transferred over a non-secure network, albeit in a less secure manner. The web server system 120 is connected to the document processing system 130 via software within a computer system. Other embodiments of the invention may integrate the document processing system 110 with the image capture system 130. In this case, the web server system 120 is not necessary.

Under typical operation, System 110 is an image capture system that receives physical documents and scans them. The image capture system 110 is described in greater detail below.

Under typical operation, System 120 is a web server system that receives the scanned documents and returns the extracted data over the Internet. Some embodiments of the invention may not have a web server system 120. The web server system 120 is described in greater detail below.

Under typical operation, System 130 is a document processing system. The document processing system 130 extracts the received data into files and databases per a predetermined scheme. Under preferred embodiments, the document processing system 130 is comprised of several modules that are part of a highly distributed architecture which consists of several independent processes, data repositories and databases which communicate and pass messages to each other via well defined standard and proprietary interfaces. Even though the document processing system 130 may be built in a loosely coupled manner to achieve maximum scalability and throughput, the same results can be achieved if the document processing system 130 was more tightly coupled in a single process with each module being a logical entity of the same process. Furthermore, the document processing system 130 supports multiple different product types which may process anywhere from hundreds to millions of documents every day for tens to thousands of customers in different markets. Under preferred embodiments, the document processing system 130 utilizes server(s) hosted in a secure data center so that documents from healthcare, insurance, banking, government, tax and other applications are processed per security policies that are HIPAA, GLBA, SAS70, etc. compliant. The document processing system 130 includes mechanisms for learning documents. The document processing system 130 is described in greater detail below.

Figure 2:
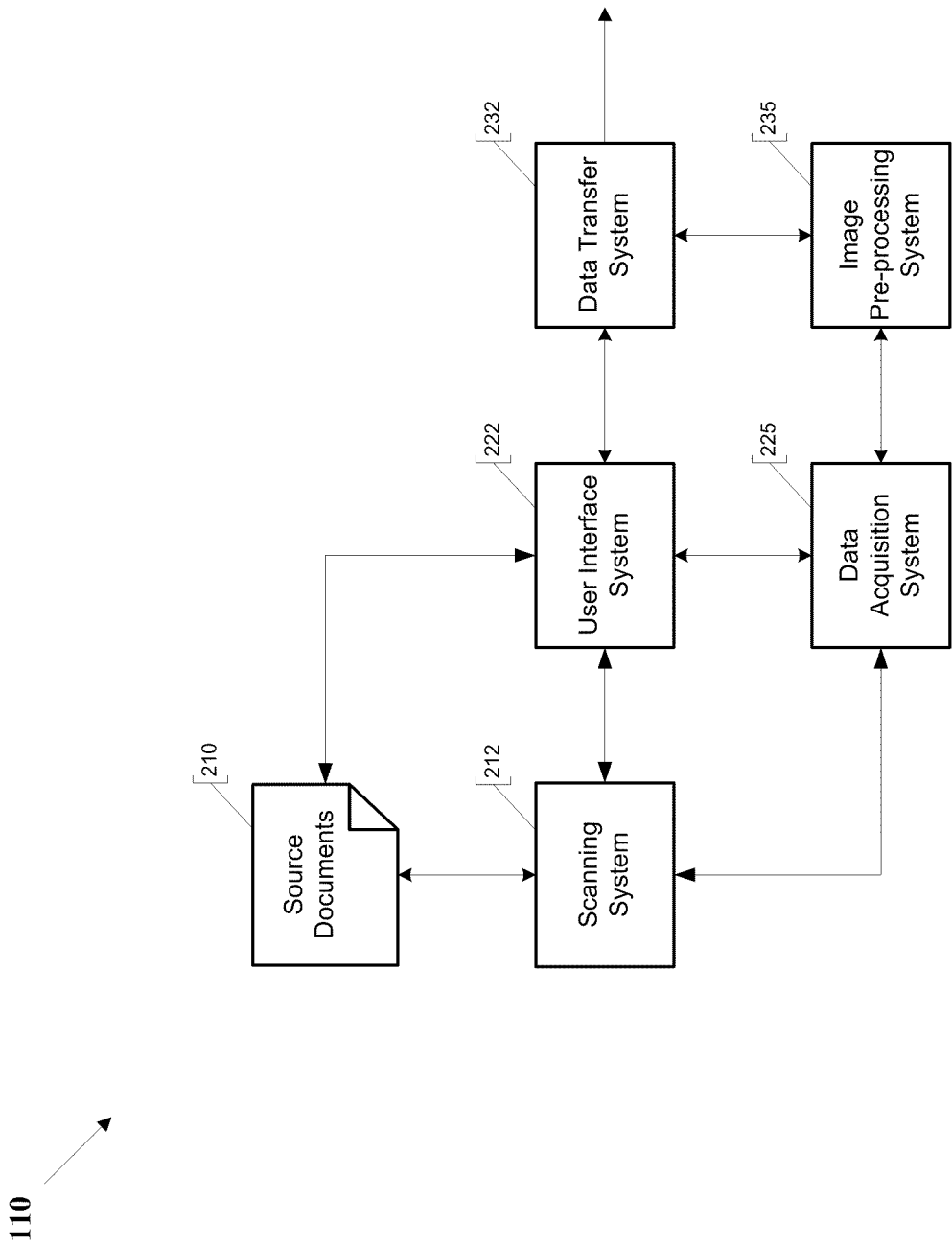
FIG. 2 is a system diagram of the image capture system 110 according to a preferred embodiment of the disclosed subject matter.

FIG. 2 is system diagram of the image capture system 110 according to a preferred embodiment of the invention. System 110 has a scanning system 212, a user interface system 222, a data acquisition system 225, a data transfer system 232 and an image pre-processing system 235. Source documents 210 in the form of papers are physically placed on an input tray of a commercial scanner. Source documents in the form of data files are received over a network by the user interface system 222. The user interface system 222 communicates with the scanning system 212 via software within a computer system, or, optionally over a computer network. The user interface system 222 may be part of the scanning system 212 in some embodiments of the image capture system 110. The user interface system 222 communicates with the data acquisition system 225 via software within a computer system. The user interface system 222 communicates with the data transfer system 232 via software within a computer system. The data acquisition system 225 communicates with the scanning system 212 via a physical connection, such as a high-speed Universal Serial Bus (USB) 2.0, or, optionally, over a network. The data acquisition may also be part of the scanning system 212 in certain embodiments of the image capture system 110. The data acquisition system 225 communicates with the image pre-processing system 235 via software within a computer system. The data transfer system 232 communicates with the image pre-processing system 235 via software within a computer system. The data acquisition system and the data transfer system may also be part of the scanning system 212 in some embodiments of the image capture system 110.

Element 210 is a source document in the form of either one or more physical sheets of paper, or a digital file containing images of one or more sheets of paper. The digital file can be in one of many formats, such as PDF, TIFF, BMP, or JPEG.

System 212 is a scanning system. Under preferred embodiments, conventional scanning systems may be used such as those from Bell +Howell, Canon, Fujitsu, Kodak, Panasonic and Xerox. These embodiments include scanners connected directly to a computer, shared scanners connected to a computer over a network, and smart scanners that include embedded computational functionality to add third-party applications. The scanning system 212 captures an image of the scanned document as a computer file; the file is often in a standard format such as PDF, TIFF, BMP, or JPEG.

Figure 9:
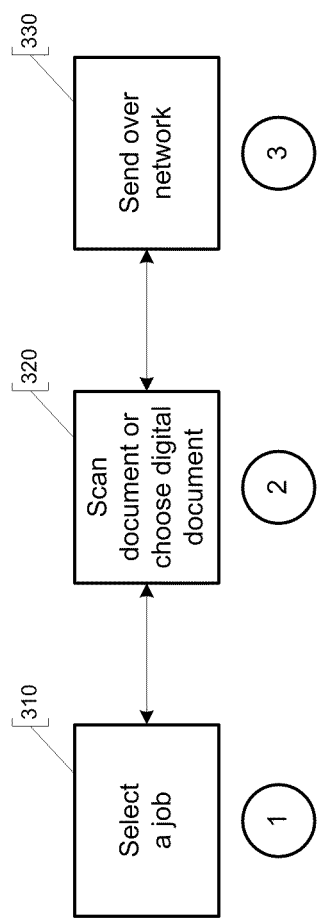
FIG. 9 is an illustration of three-step document submission process according to a preferred embodiment of the disclosed subject matter.

System 222 is a user interface system. Under preferred embodiments, the user interface system 222 runs in a browser and presents a user with a three-step means for submitting documents to be organized as shown in FIG. 9. In step one, the user interface system 222 provides a mechanism for selecting a job from a list of jobs; additionally, it allows jobs to be added to the job list. In step two, the user interface system 222 provides a mechanism for initiating the scanning of physical papers; additionally, it provides a browsing mechanism for selecting a file on a computer or network. Optionally, one or more sets of papers can be scanned and one or more files can be selected. In step three, the user interface system 222 provides a mechanism for sending the job information and selected documents over a network to the server system. Under preferred embodiments, the user interface system 222 also presents a user with the status of jobs that have been submitted as submitted or completed; optionally, it presents the expected completion date and time of submitted jobs that have not been completed. The user interface system 222 also presents a user with a mechanism for receiving submitted documents and extracted data. The user interface system 222 also provides a mechanism for deleting files from the system. Other embodiments of the user interface system 222 may run within an application that provides the scan feature as part of a broader function, or within a simple data entry system that is composed of only a touch screen and/or one or more buttons. Furthermore, the user interface system 222 also may also be embodied by a programmable API that provides the same or similar functionality to another application program.

System 225 is a data acquisition system. Under preferred embodiments, the data acquisition system 225 controls the settings of the scanning system. Many scanning systems in use today require users to manually set scanner settings so that images are captured, for example, at 300 dots per inch (dpi) as binary data (black-and-white.) Commercial scanners and scanning software modify the original source document image that often include high resolution and, possibly, color or gray-scale elements. The resolution is often reduced to limit file size. Color and gray-scale elements are often binarized, e.g. converted to black or white pixels, via a process known as thresholding, also to reduce file size. Under preferred embodiments, the data acquisition system sets the scan parameters of the scanning system. The data acquisition system commands the scanning system to begin operation and receives the scanned document computer file from the scanning operation. The data acquisition system 225 could be part of the scanning system 212, in certain embodiments. Moreover, the operation of the data acquisition system 212 could be automatically triggered by the scan function, in certain embodiments. Reference "System for Optimal Document Scanning" U.S. patent application Ser. No. 12/351,302.

System 232 is a data transfer system. Under preferred embodiments, the data transfer system 232 manages the SSL connection and associated data transfer with the server system. The data transfer system 232 could be part of the scanning system 212, in certain embodiments. Moreover, the operation of the data transfer system 232 could be automatically triggered by the scan function, in certain embodiments.

System 235 is an optional image pre-processing system. The image pre-processing system 235 enhances the image quality of scanned images for a given resolution and other scanner settings. The image pre-processing system 235 may be implemented as part of the image capture system as depicted on FIG. 2 or as part of the server system as depicted on FIG. 3. When part of the image capture system, the image pre-processing system may also be implemented within the scanning system 212, in certain embodiments. Details of the image pre-processing system 235 are described in further detail below as part of the document processing system 130.

Figure 3:
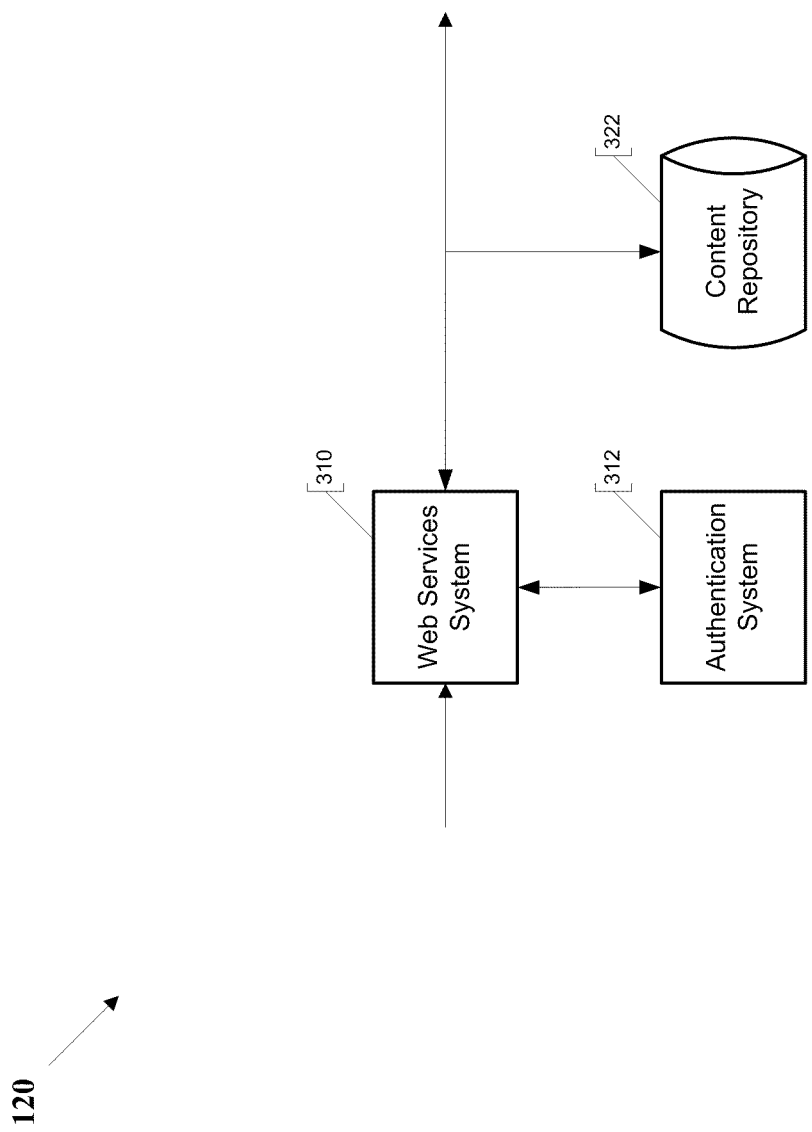
FIG. 3 is a system diagram of the web server system 120 according to a preferred embodiment of the disclosed subject matter.

FIG. 3 is a system diagram of the web server system 120 according to a preferred embodiment of the invention. System 120 has a web services system 310, an authentication system 312 and a content repository 322. The web services system 310 communicates with the authentication system 312 via software within a computer system. The web services system 310 communicates with the content repository 322 via software within a computer system.

System 310 is a web services system. Under preferred embodiments, the web services system 310 provides the production system connection to the network that interfaces with the image capture system. Such a network could be a local-area network (LAN), a wide-area network (WAN) or the Internet. As described above, the preferred implementation transfers all data over the network using Secure Sockets Layer (SSL) technology with enhanced 128-bit encryption. Standard web services include Apache, RedHat JBoss Web Server, Microsoft IIS, Sun Java System Web Server, IBM Websphere, etc. Under preferred embodiments, users upload their source electronic documents or download their organized electronic documents and extracted data in a secure manner using HTTP or HTTPS. Other mechanisms for secure data transfer can also be used. The web service system 310 also relays necessary parameters to the application servers that will process the electronic document.

System 312 is an authentication system. The authentication system 312 allows secure and authorized access to the content repository 322. Under preferred embodiments, an LDAP authentication system is used; however, other authentication systems can also be used. In general, an LDAP server is used to process queries and updates to an LDAP information directory. For example, a company could store all of the following very efficiently in an LDAP directory:

The company employee phone book and organizational chart
  External customer contact information
  Infrastructure services information, including NIS maps, email aliases, and so on
  Configuration information for distributed software packages
  Public certificates and security keys Under a preferred embodiment, document organization and access rights are managed by the access control privileges stored in the LDAP repository.

System 322 is a content repository. The content repository 322 can be a simple file system, a relational database, an object oriented database, any other persistent storage system or technology, or a combination of one or more of these. Under a preferred embodiment, the content repository 322 is based on Java Standard Requests 170 (JSR 170.) JSR 170 is a standard implementation-independent way to access content bi-directionally on a granular level within a content repository. The content repository 322 is a generic application "data store" that can be used for storing both text and binary data (images, word processor documents, PDFs, etc.) One key feature of a content repository is that one does not have to worry about how the data is actually stored: data could be stored in a relational database (RDBMS) or a file system or as an XML document. In addition to providing services for storing and retrieving the data, most content repositories provide advanced services such as uniform access control, searching, versioning, observation, locking, and more.

Under preferred embodiments, documents in the content repository 322 are available to the end user via a portal. For example, in the current implementation of the system, the user can click on a web browser application button "View Source Document" in the portal and view the original scanned document over a secure network. Essentially, the content repository 322 serves as an off-site secure storage facility for users' electronic documents.

Figure 4:
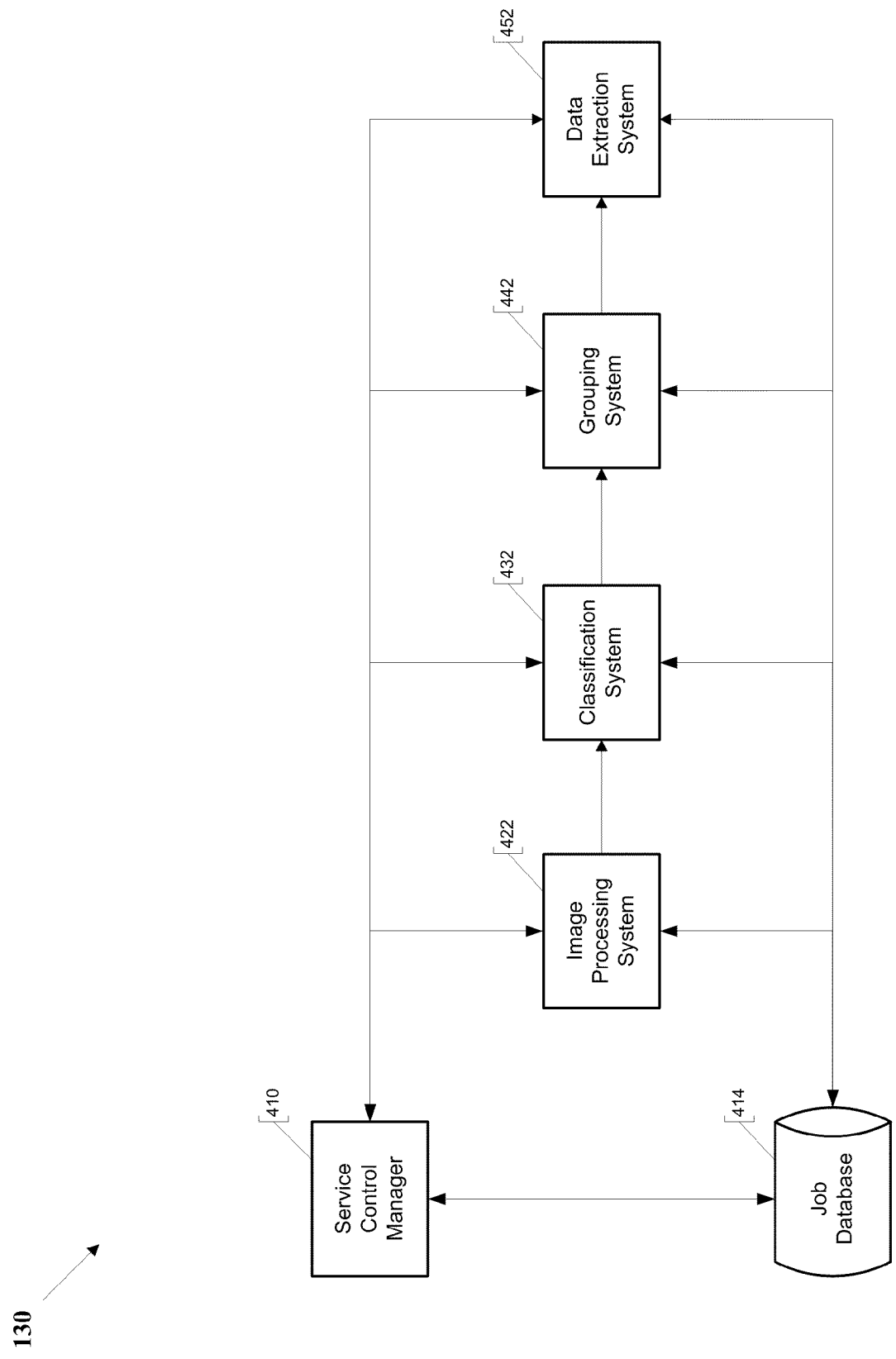
FIG. 4 is a system diagram of the document processing system 130 according to a preferred embodiment of the disclosed subject matter.

FIG. 4 is a system diagram of the document processing system 130 according to a preferred embodiment of the invention. System 130 has a service control manager 410, a job database 414, an image processing system 422, a classification system 432, a grouping system 442 and a data extraction system 452. The service control manager 410 communicates with the job database 414 via software within a computer system. The service control manager 410 communicates with the image processing system 422 via software within a computer system. The service control manager 410 communicates with the classification system 432 via software within a computer system. The service control manager 410 communicates with the grouping system 442 via software within a computer system. The service control manager 410 communicates with the data extraction system 452 via software within a computer system. The image processing system 422 communicates with the job database 414 via software within a computer system. The classification system 432 communicates with the job database 414 via software within a computer system. The grouping system 442 communicates with the job database 414 via software within a computer system. The data extraction system 452 communicates with the job database 414 via software within a computer system. The image processing system 422 communicates with the classification system 432 via software within a computer system. The classification system 432 communicates with the grouping system 442 via software within a computer system. The grouping system 442 communicates with the data extraction system 452 via software within a computer system. The document processing system 130 can be implemented as a set of communicating programs or as a single integrated program.

System 410 is a service control manager. Service control manager 410 is a system that controls the state machine for each job. The state machine identifies the different states and the steps that a job has to progress through in order to achieve its final objective, in this case being data extracted from an electronic document. In the current system, the service control manager 410 is designed to be highly scalable and distributed. Under preferred embodiments, the service control manager 410 is multi-threaded to handle hundreds or thousands of jobs at any given time. The service control manager 410 also implements message queues to communicate with other processes regarding their own states. Alternately, the service control manager 410 can be implemented in other architectures; for example, one can implement a complete database driven approach to step through all the different steps required to process such a job.

In preferred implementations the service control manager 410 subscribes to events for each new incoming job that need to be processed. Once a new job arrives, the service control manager 410 pre-processes the job by taking the electronic document and separating each image (or page) into its own bitmap image for further processing. For example, if an electronic document had 30 pages, the system will create 30 images for processing. Each job in the system is given a unique identity. Furthermore, each page is given a unique page identity that is linked to the job identity. After the service control manager 410 has created image files by pre-processing the document into individual pages, it transitions the state of each page to image processing.

System 414 is a job database. Job database 414 is used to store the images and data associated with each of the jobs being processed. A "job" is defined as a set of source documents and all intermediate and final processing outputs. Job database 414 can be file system storage, a relational database, XML document or a combination of these. In preferred implementations, job database 414 uses a file system storage to store large blob (binary large objects) and a relational database to store pointers to the blobs and other information pertinent to processing the job.

System 422 is an image processing system. The image processing system 422 removes noise from the page image and properly orients the page so that document image analysis can be performed more accurately. The accuracy of the data extraction greatly depends on the quality of the image; thus image processing is included under preferred embodiments. The image processing system 422 performs connected component analysis and, utilizing a line detection system, creates "confetti" images which are small sections of the complete page image. Under preferred embodiments, the confetti images are accompanied by the coordinates of the image sub-section. The image processing system 422 is described in greater detail below.

System 432 is a classification system. The classification system 432 recognizes the page as one of a pre-identified set of types of documents. A major difficulty in categorizing a page as one of a large number of documents is the high dimensionality of the feature space. Conventional approaches that depend on text categorization alone are faced with a native feature space that consists of many unique terms (words as well as phrases) that occur in documents, which can be hundreds or thousands of terms for even a moderate-sized collection of unique documents. In one domain, multiple systems that categorize income tax documents such as W-2, 1099-INT, K-1 and other forms have experienced poor accuracy because of the thousands of variations of tax documents. The preferred implementation uses a combination of image pattern recognition and text analysis to distinguish documents and machine learning technology to scale to large numbers of documents. The classification system 432 is described in greater detail below.

System 442 is a grouping system. The grouping system 442 groups pages that have been categorized by the classification system 432 as specific instances of a pre-identified set of types of documents into sets of multi-page documents. The grouping system 442 is described in greater detail below.

System 452 is a data extraction system. The data extraction system 452 extracts data from pages that have been categorized by the classification system 432 as specific instances of a pre-identified set of types of documents. There are many difficulties in extracting data accurately from documents not specifically designed for automatic data extraction. Typically, the document images are not of uniformly high quality. The document images can be skewed, streaked, smudged, populated with artifacts and otherwise degraded in ways that cannot be fully compensated by image processing. The document layout can appear to be random. The relevant content (data labels and data values) can be quite small, impaired by lines and background shading or otherwise not be processed well by OCR. In the above-mentioned domain of tax document automation, vendors using conventional data extraction methods claim 50% or less data extraction and admit to numerous errors. The data extraction system 452 uses OCR data extraction, non-OCR visual recognition, contextual feature matching, business intelligence and output formatting, all with machine learning elements, to accurately extract and present data from a wide range of documents. The data extraction system 452 is described in greater detail below.

Figure 5:
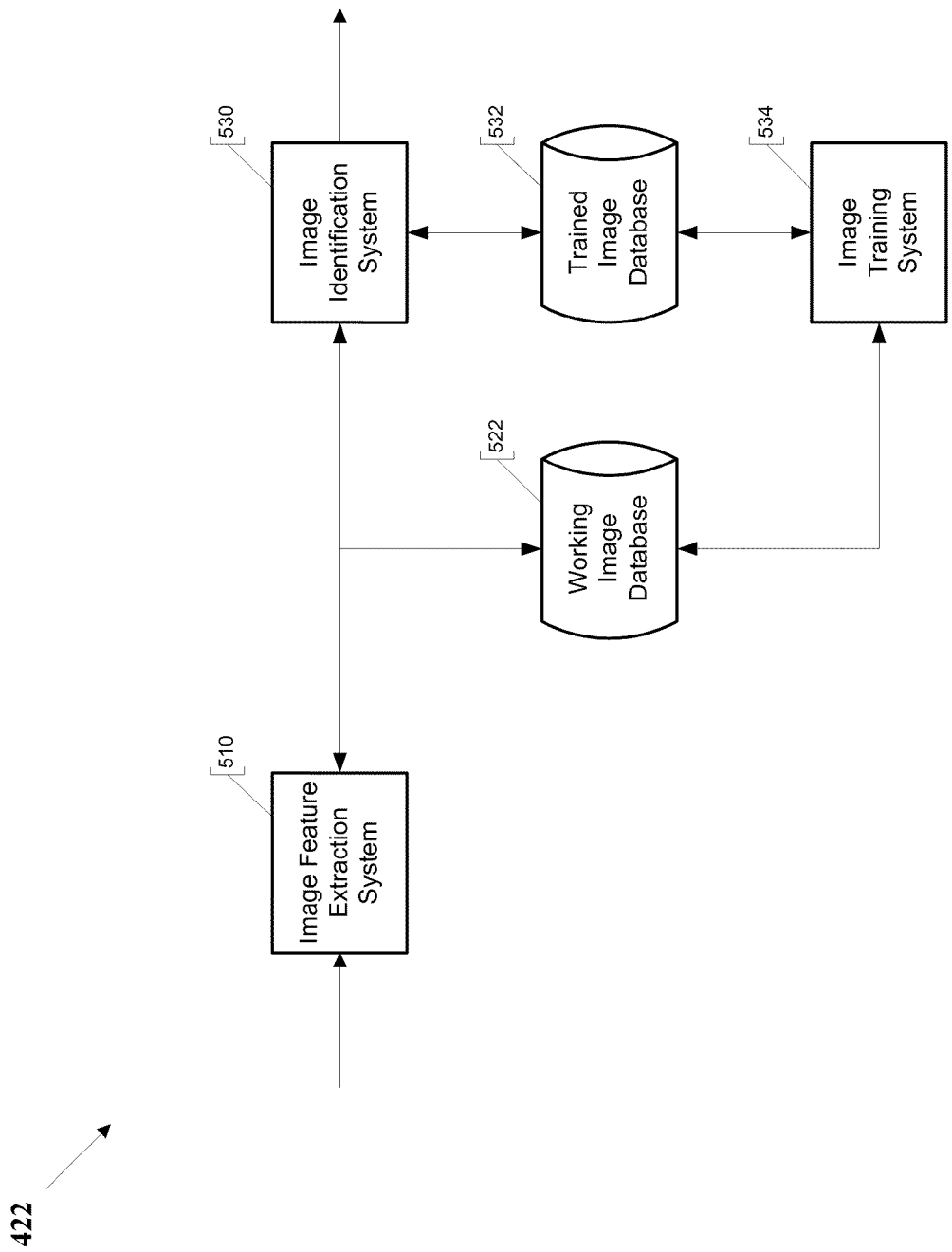
FIG. 5 is a system diagram of the image processing system 422 according to a preferred embodiment of the disclosed subject matter.

FIG. 5 is an image processing system 422 according to a preferred embodiment of the invention. System 422 has an image feature extraction system 510, a working image database 522, an image identification system 530, a trained image database 532 and an image training system 534. The image feature extraction system 510 is connected to the working image database 522 via software within a computer system. The image feature extraction system 510 is connected to the image identification system 530 via software within a computer system. The image identification system 530 is connected to the working image database 522 via software within a computer system. The image identification system 530 is connected to the trained image database 532 via software within a computer system. The image training system 534 is connected to the working image database 522 via software within a computer system. The image training system 534 is connected to the trained image database 532 via software within a computer system.

System 510 is an image feature extraction system. Image feature extraction system 510 extracts images from the submitted job artifacts. Image feature extraction system 510 normalizes images into a uniform consistent form for further image processing. Image feature extraction system 510 binarizes color and grayscale images. A document can be captured as a color, grayscale or binary image by a scanning device. Common problems seen in images from scanning devices include:

poor contrast due to lack of sufficient or controlled lighting
non-uniform image background intensity due to uneven illumination
immoderate amounts of random noise due to limited sensitivity of the sensors Many document images are rich in color and have complex backgrounds. Accurately processing such documents typically requires time-consuming processing and manual tuning of various parameters. Detecting text in such documents is difficult for typical optical character recognition systems that are optimized for binary images on clean backgrounds. For the data extraction system to work well, document images must be binarized and the text must be readable. Typically, general purpose scanners binarize images using global thresholding utilizing a single threshold value, generally chosen on statistics of the global image. Global thresholding is not adapted well for images that suffer from common illumination or noise problems. Global thresholding often results in characters that are broken, merged or degraded; further, thousands of connected components can be created by binarization noise. Images degraded by global thresholding are typically candidates for low quality data extraction.

The preferred embodiment of the binarization system utilizes local thresholding where the threshold value varies based on the local content in the document image. The preferred implementation is built on an adaptive thresholding technique which exploits local image contrast (reference: *IEICE Electronics Express*, Vol. 1, No 16, pp. 501-506.) The adaptive nature of this technique is based on flexible weights that are computed based on local mean and standard deviations calculated for the gray values in the primary local zone or window. The preferred embodiment experimentally determines optimum median filters across a large set of document images for each application space. Reference "Systems and Methods for Handling and Distinguishing Binarized Background Artifacts in the Vicinity of Document Text and Image Features indicative of a Document Category" US 2009/0119296 A1.

The preferred embodiment of image feature extraction system 510 removes noise in the form of dots, specks and blobs from document images. In the preferred embodiment, minimum and maximum dot sizes to be removed are specified. The preferred embodiment also performs image reversal so that white text or line objects on black backgrounds are detected and inverted to black-on-white. The preferred embodiment also performs two noise removal techniques.

The first technique starts with any small region of a binary image. The preferred implementation takes a 35×35 pixel region. In this region all background pixels are assigned value "0." Pixels adjacent to background are given value "1." A matrix is developed in this manner. In effect each pixel is given a value called the "distance transform" equal to its distance from the closest background pixel. The preferred implementation runs a smoothing technique on this distance transform. Smoothing is a process by which data points are averaged with their neighbors in a series; this typically has the effect of blurring the sharp edges in the smoothed data. Smoothing is sometimes referred to as filtering, because smoothing has the effect of suppressing high frequency signals and enhancing low frequency signals. Of the many different methods of smoothing, the preferred implementation uses a Gaussian kernel. In particular, the preferred implementation performs Gaussian smoothening with a filter using variance of 0.5 and a 3×3 kernel or convolution mask on the distance transform. Thresholding with a thresholding value of 0.85 is performed on the convolved images and the resulting data is converted to its binary space.

The second technique uses connected component analysis to identify small or bad blocks. In this method a sliding mask is created of a known size. The preferred implementation uses a mask that is 35×35 pixels wide. This mask slides over the entire image and is used to detect the number of blobs (connected components) that are less than 10 pixels in size. If the number of blobs is greater than five, then all blobs are removed. This process is repeated by sliding the mask over the entire image.

Image feature extraction system 510 corrects skew, small angular rotations, in document images. Skew correction not only improves the visual appearance of the document but also improves baseline determination, simplifies interpretation of page layout and improves text recognition. Several available image processing libraries do skew correction. The preferred implementation of skew detection uses part of the open source Leptonica image processing library.

Image feature extraction system 510 corrects document orientation. Documents, originally in either portrait or landscape format may be rotated by 0, 90, 180 or 270 degrees during scanning The preferred implementation of orientation correction performs OCR on small words or phrase images at all four orientations: 0, 90, 180 and 270 degrees. Small samples are selected from a document and the confidence is averaged across the sample. The orientation that has the highest confidence determines the correct orientation of the document.

Image feature extraction system 510 performs connected component analysis using a very standard technique. The preferred implementation of connected component analysis uses the open source Image Processing Library 98 (IPL98.)

Image feature extraction system 510 detects text lines using the technique described by Okun et al. (reference: *Robust Text Detection from Binarized Document Images*) to identify candidate text segments blocks of consistent heights. For a page from a book, this method may identify a whole line as a block, while for a form with many boxes this method will identify the text in each box.

Image feature extraction system 510 generates confetti information by storing the coordinates of all of the text blocks in the working image database 522.

Image feature extraction system 510 performs image processing on the confetti images. Traditionally, if image processing is performed on document images, the entire document image is subject to a single type of image processing. This "single algorithm" process might, for example, thin the characters on the document image. In some cases, the accuracy of text extraction with OCR might improve after thinning; however, in other cases on the same document, the accuracy of text extraction accuracy of text extraction with OCR might improve with thickening. Image feature extraction system 510 applies multiple morphological operators to individual confetti images. Then, for each variation of each confetti image (including the original, unprocessed versions and all processed versions,) image feature extraction system 510 extracts text with OCR. Optionally, image feature extraction system 510 extracts text with different OCR engines. Several OCR software programs are available on the market today. The preferred implementation uses Tesseract, an open source software which allows custom modifications. The extracted text output (text, OCR engine used and corresponding confidence value) is saved for each version of each confetti image. An illustration of source document images before and after image processing is shown in FIG. 11.

Figure 12:
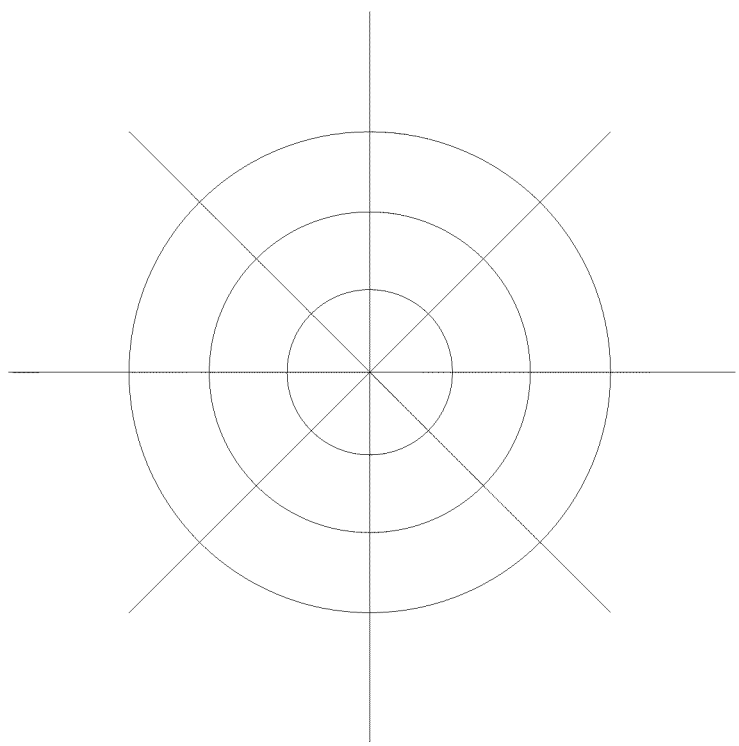
FIG. 12 is an illustration of a log polar histogram according to a preferred embodiment of the disclosed subject matter.
Figure 14:
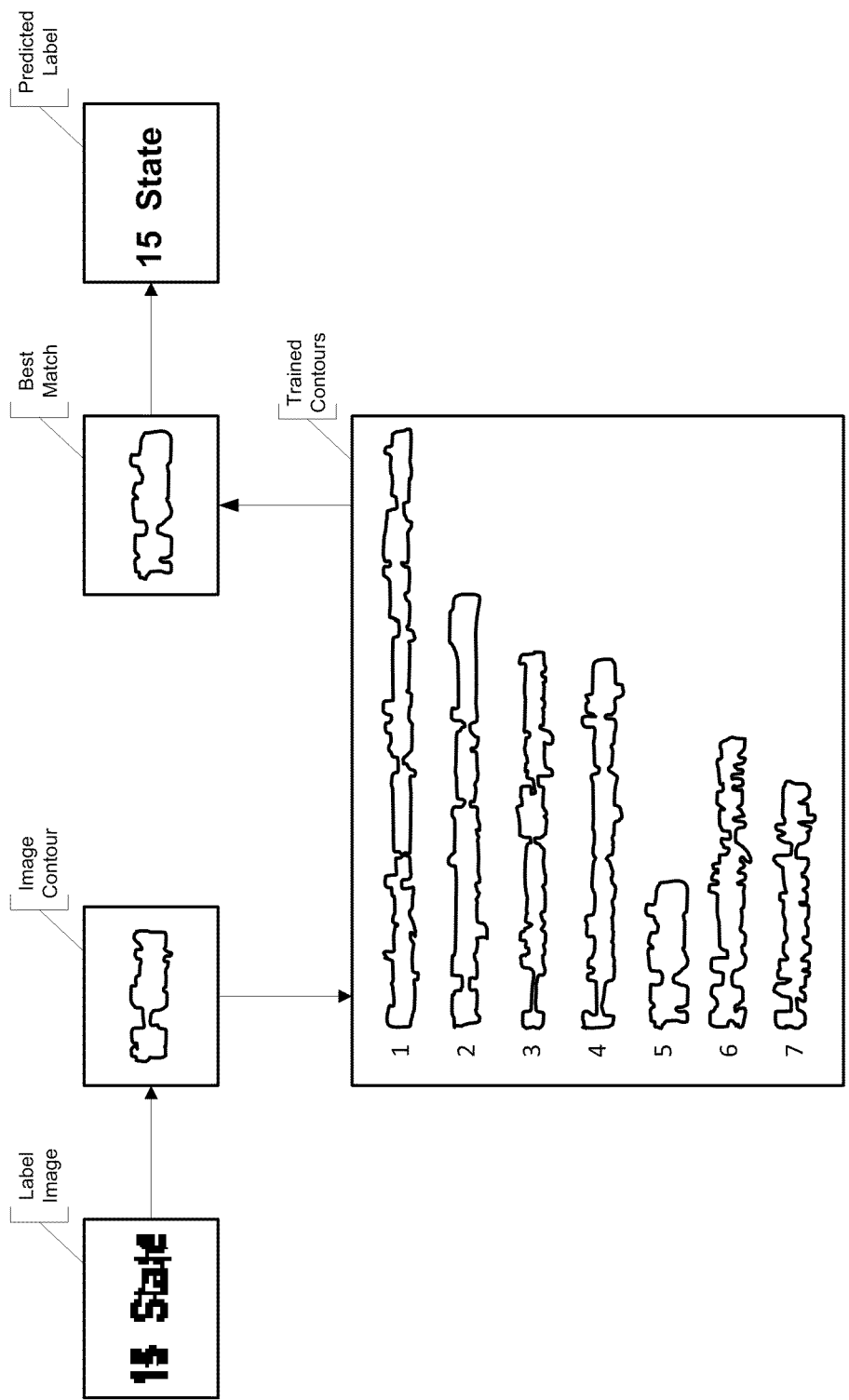
FIG. 14 is an illustration of label contour matching according to a preferred embodiment of the disclosed subject matter.

Image feature extraction system 510 determines the contour of image areas within confetti boxes. The contour of an image within a confetti is illustrated in FIG. 14. The size of the confetti image area is first normalized. In preferred implementations, 256 equidistant points on the contour are chosen, and the relative location of these points is recorded in a log-polar histogram as illustrated in FIG. 12. Values for log r are placed in 3 bins, while values for the angle are placed in 8 bins. The relative location of a point with respect to another is therefore a number from 1 through 24.

The feature vector for the shape of the contour as illustrated in FIG. 14 is a 256×256 matrix of numbers from 1 through 24 that considering all the 256 points and their relative locations (reference: *IEEE Transactions on Pattern Analysis and Machine Intelligence*, Vol. 24, No 24, pp. 509-422.)

System 522 is a working image database. Working image database 522 is used to support both the processing of jobs and the image training system 534. Working image database 522 can be a file system, a relational database, a XML document or a combination of these. In preferred implementations, the working image database 522 uses a file system to store large blobs (binary large objects) and a relational database to store pointers to the blobs and other information pertinent to processing the job.

Figure 10:
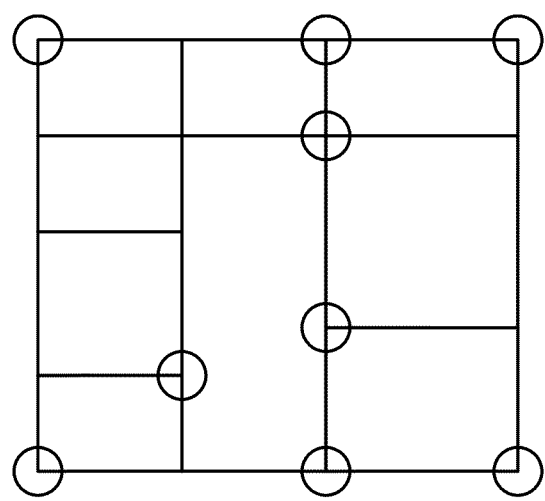
FIG. 10 is an illustration of the nine types of point patterns according to a preferred embodiment of the disclosed subject matter.

System 530 is an image identification system. The image identification system 530 looks for point and line features. The preferred implementation performs image layout analysis using two image properties, the point of intersection of lines and edge points, of text paragraphs. Every unique representation of points is referred as a unique class in the system and represents a unique point pattern in the system database. The preferred implementation uses a heuristically developed convolution method only on black pixels to perform a faster computation The system identifies nine types of points: four T's, four L's, and one cross (X) using nine masks; examples of these nine point patterns are shown in FIG. 10.

The preferred implementation of point pattern matching is performed by creating a string from the points detected in the image and then using the Levenshtein distance to measure the gap between the trained set with the input image. The Levenshtein distance between two strings is given by the minimum number of operations needed to transform one string into the other, where an operation is an insertion, deletion, or substitution of a single character.

The image identification system 530 selects the extracted text from the sets of extracted text for each confetti image according to rules stored in the trained image database 532. In preferred implementations of the image identification system 530, extracted text values that exceed specified OCR engine-specific thresholds are candidates for selection. The best text value that is produced from the image after applying the morphological operators is chosen based on OCR confidence, similarity and presence in a dictionary.

In preferred implementations, based on the results of the "first pass" OCR performed by the image feature extraction system 510, the image identification system 530 selects the text value from a contextually limited lexicon (words and characters) that is stored in the trained image database 532. In preferred implementations, the image identification system 530 requests the image feature extraction system 510 to perform a "second pass" OCR operation using an engine specifically tailored for extracting the type of characters that the image identification system 530 identified as present in the confetti image. As an example, if the image identification system 530 identified the confetti image as containing characters associated only with currency values (such as the digits 0-9, dollar sign, period, comma, minus sign, parentheses and asterisk) then the "second pass" OCR would be conducted with a currency character recognition system that is tuned to identify numerical and certain special characters. The currency character recognition system utilizes OCR technology tailored to the reduced character set associated with currency values. In the preferred implementation, the currency character set is defined as the digits [0-9] and the special character set [$.,-()]. The preferred implementation performs character segmentation to break up the image into individual characters. It then uses a normalized bitmap of the image of each character as a feature vector. This feature vector is passed into a neural network based classifier that was trained on more than 10,000 instances of each character that are stored in the trained image database 532.

Label identification by traditional means of matching extracted text to a database of expected values is often not possible; this is caused by the inability of OCR engines to accurately extract text from very small and degraded images. The present invention's use of both multiple versions of the confetti images (original and image processed) and multiple OCR engines significantly reduces but does not eliminate the problem of inaccurate text extraction. Two additional techniques are used to identify text from images.

The image identification system 530 performs contour matching by comparing the contour shape features extracted by the feature extraction system 510, with the corresponding features of known confetti images stored in the trained image database 532. Similarity between images is determined by a point-wise comparison of feature vectors. The preferred implementation uses a KNN classifier for this process. FIG. 14 illustrates label contour matching.

System 532 is a trained image database. Trained image database 532 is used to support both the processing of jobs and the image training system 534. Trained image database 532 can be a file system, a relational database, a XML document or a combination of these. In preferred implementations, the trained image database 532 uses a file system to store large blobs (binary large objects) and a relational database to store pointers to the blobs and other information pertinent to processing the job. As the system grows "smarter" by recognizing more images and more rules pertaining to restricting OCR with contextual information, the trained image database 532 grows. As the machine learning system sees more trained images, its image identification accuracy increases.

System 534 is an image training system. The image training system 534 performs computations on the data in its document database corresponding to the image that are in place and generates datasets used by the image identification system for recognizing the content in source document images. The results of the training and re-training process are image datasets that are updated in the trained image database 532.

The image training system 534 implements a continuous learning process in which images and text that are not properly identified are sent to training The training process results in an expanded data set in the trained image database 532, thereby improving the accuracy of the system over time. As the trained image database 532 grows, the system requires an asymptotically lower percentage of images to be trained. Preferred implementations use machine learning supported by the image training system 534 that adapts to a growing set of documents images. Additional documents add additional image features that must be analyzed.

The learning system receives documents from the working image database 522 that were provided by the image identification system 530. These documents are not trained and do not have corresponding model data in the trained image database 532. All such documents are made persistent in the trained image database 532.

Preferred implementations of the training system include tuning and optimization to handle noise generated during both the training phase and the testing phase. The training phase is also called learning phase since the parameters and weights are tuned to improve the learning and adaptability of the system by fitting the model that minimizes the error function of the dataset.

The learning technique in the preferred implementation is supervised learning. Applications in which training data comprises examples of input vectors along with their corresponding target vectors are known as supervised learning problems. Example input vectors include key words and line patterns of the document layouts. Example target vectors include possible classes of output in the organized document. Supervised learning avoids the unstable states that can be reached by unsupervised learning and reinforcement learning systems.

Figure 6:
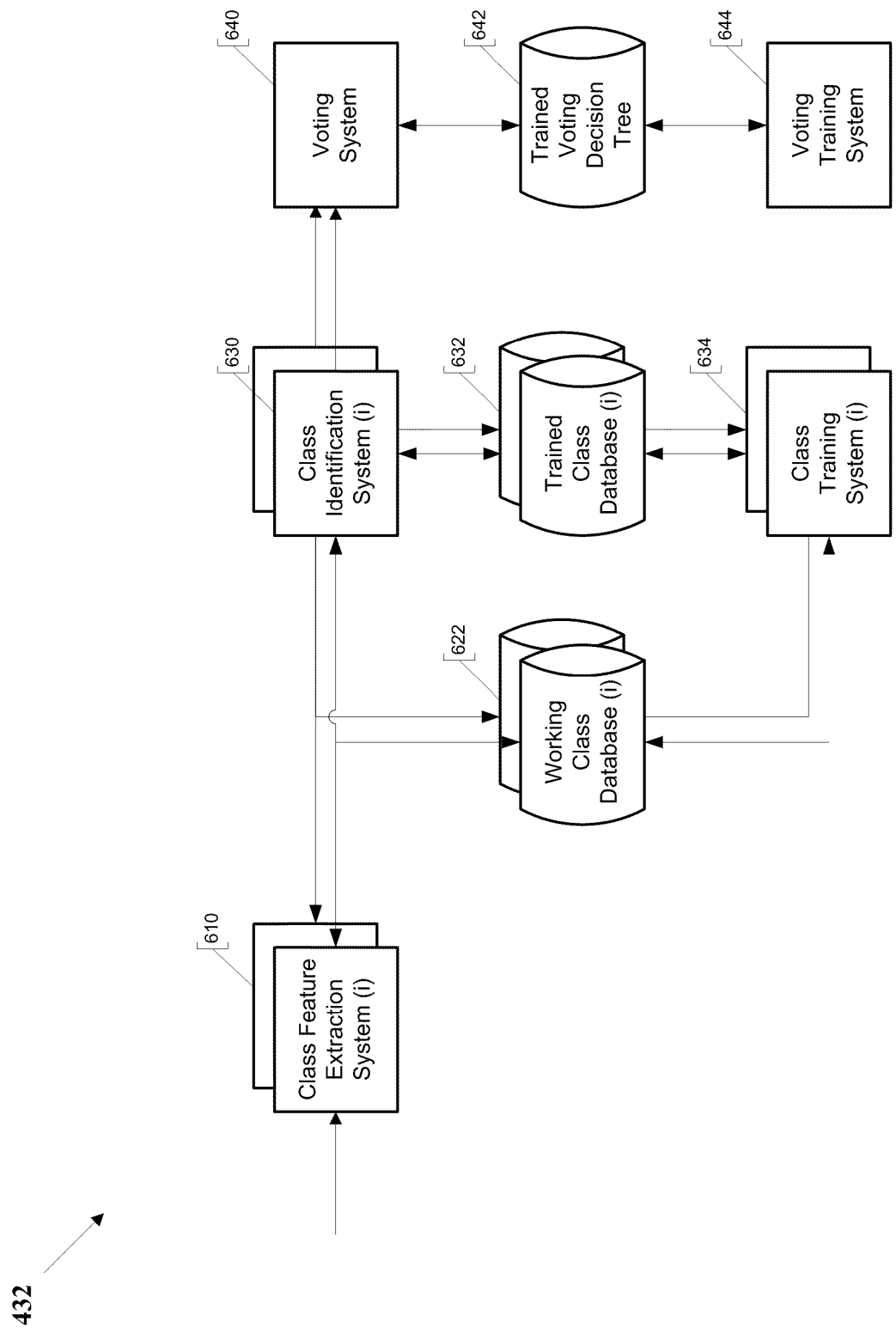
FIG. 6 is a system diagram of the classification system 432 according to a preferred embodiment of the disclosed subject matter.

FIG. 6 is a classification system 432 according to a preferred embodiment of the invention. System 432 has class feature extraction systems 610, working class databases 622, class identification systems 630, trained class databases 632, class training systems 634, a voting system 640, a trained voting decision tree 642 and a voting training system 644. The class feature extraction system (i) 610 is connected to the working class database (i) 622 via software within a computer system. The class feature extraction system (i) 610 is connected to the class identification system (i) 630 via software within a computer system. The class identification system (i) 630 is connected to the working class database (i) 622 via software within a computer system. The class identification system (i) 630 is connected to the trained class database (i) 632 via software within a computer system. The class training system (i) 634 is connected to the working class database (i) 622 via software within a computer system. The class training system (i) 634 is connected to the trained class database (i) 632 via software within a computer system. The class identification system (i) 630 is connected to the voting system 640 via software within a computer system. The voting system 640 is connected to the trained voting decision tree 642 via software within a computer system. The trained voting decision tree 642 is connected to the voting training system 644 via software within a computer system.

Under the preferred embodiment, classification system 432 is composed of four classification subsystems whose outputs are evaluated by the voting system 640. The four classification subsystems are:
  Combined text and image (CTI) classification subsystem
  CRK classification subsystem
  SVM classification subsystem
  CCS classification subsystem Each of the above subsystems has a class feature extraction systems 610, a working class database 622, a class identification system 630, a trained class database 632 and a class training system 634.

Each system 610 is a class feature extraction system. Class feature extraction systems 610 receive extracted text and image features (discussed above.) The CTI classification subsystem and the CRK classification subsystem use the extracted text features.

The SVM classification subsystem addresses the problem of classifying documents as OCR results improve; as document quality, scanning practices, image processing or OCR engines improve, the extracted source document text from differs from the extracted text of training documents, causing classification to worse. The SVM class feature extraction systems 610 filters extracted text features, passing on only those text features that match a dictionary entry.

In the preferred implementation, the SVM class feature extraction system 610 matches OCR text output of a text document against a large dictionary. If no dictionary match is found, the OCR text is discarded. A feature vector that consists of all OCR text that matches the dictionary is passed to an SVM-based classifier to determine the document class.

The SVM classification subsystem is made resilient to OCR errors by introducing typical OCR errors into the dictionary. However, the classifier remains robust to OCR improvements because the dictionary includes correct English words.

The CCS classification subsystem addresses the problem of classifying documents with poor image quality that do not OCR well; such documents have poor text extraction and therefore poor text-based classification. The CCS classification subsystem uses robust image features exclusively to classify documents.

In the preferred implementation, the CCS class feature extraction system 610 first creates a code book using seven randomly selected documents. Each of these documents is divided into 10×10 pixel blocks. The K-means algorithm is applied to each block to generate 150 clusters. The mean of these clusters is taken as the representative codeword for that cluster. The clusters are arbitrarily numbered from 1 to 150; the result forms a vocabulary for representing source document images as a feature vector of this vocabulary.

Each source document image is divided into four quadrants. A vector is formed for each quadrant following the term frequency inverse document frequency (TF-IDF) model. At the classification step, a K-means approach is used. A test document is encoded to the feature vector form, and its Euclidean distance is computed from each of the clusters. The labels of the closest clusters are assigned to the document.

Each system 622 is a working class database. Working class databases 622 are used to support both the processing of jobs and the class training systems 634. Working class databases 622 can be file systems, relational databases, XML documents or a combination of these. In preferred implementations, the working class databases 622 use file systems to store large blobs (binary large objects) and relational databases to store pointers to the blobs and other information pertinent to processing the job.

System 630 is a class identification system. Class identification system 630 functions differently for each of the four classification subsystems.

In the first case, the CTI classification subsystem, the class identification system 630 presents the extracted text to a key word identification system. The key word identification system receives the confetti text and interfaces with the trained class database 632. The trained class database 632 consists of a global dictionary, global priority words and the point pattern signatures of all the trained forms, all of which are created by the class training system 634.

Under the preferred embodiment, stop words are from the list of extracted. Stop words are common words—for example: "a," "the," "it," "not," and, in the case of income tax documents, for example, phrases and words including "Internal Revenue Service," "OMB," "name," "address," etc. The stop words are provided by the trained class database 632 and, in the preferred embodiment, are domain specific.

In the preferred implementation, the priority of each word is calculated as function of line height (LnHt) of the word, partial of full match (PFM) with form name and total number of words in the form (N). The approximate value of priority is formulated as $$Pr = (\Sigma LnHt * PFM)/N$$

The summation is taken to give more priority to the word whose frequency is higher in a particular form. Partial or full match (PFM) increases the priority if the word partially or fully matches the form name. The calculation divides by the total number of words in the form (N) to normalize the frequency if the form has a large numbers of words.

The vector space creation system stores in a table the priority of each word in the form. A vector is described as (a1, a2, . . . ak) where a1, a2 . . . ak are the magnitude in the respective dimensions. For example, for input words and corresponding line heights of a W-2 tax form, the following are word-priority vectors are stored:

| | |
|---|---|
| OMB | 10 |
| employer | 5 |
| employer | 5 |
| wages | 5 |
| compensation | 5 |
| compensation | 5 |
| dependent | 5 |
| wages | 10 |
| social | 5 |
| security | 5 |
| income | 5 |
| tax | 5 |
| federal | 5 |
| name | 5 |
| address | 5 |

The normalized valued for the priorities are:

| | |
|---|---|
| OMB | 0.666667 |
| employer | 0.666667 |
| wages | 1.000000 |
| compensation | 0.666667 |
| dependent | 0.333333 |
| social | 0.333333 |
| security | 0.333333 |
| income | 0.333333 |
| tax | 0.333333 |
| federal | 0.333333 |
| name | 0.333333 |
| address | 0.333333 |

In such a vector space, the words with larger font size or higher frequency will have higher priority.

The ranking system calculates the cosine distance of two vectors V1 and V2 as:

$$\cos \theta = (V1 \cdot V2)/(|V1|*|V2|)$$

where V1·V2 is the dot product of two vectors and |V| represents the magnitude of the vector. When the cosine distance nears 0, that means the vectors are orthogonal and when it nears 1 it means the vectors are in the same direction or similar.

The class which has the maximum cosine distance with the form is the class to which the form is classified.

The class identification system 630 performs point pattern matching based on the image features collected during image processing. As mentioned earlier, the point pattern matching of documents is performed by creating a string from the points detected in the image and then using Levenshtein distance to measure the gap between the trained set with the input image.

In the preferred embodiment of the CTI classification subsystem, the results of the ranking and the point pattern matching are used to determine the class matching values. If the system is not successful in finding a class match within a defined threshold, the document is marked as unclassified.

Figure 15:
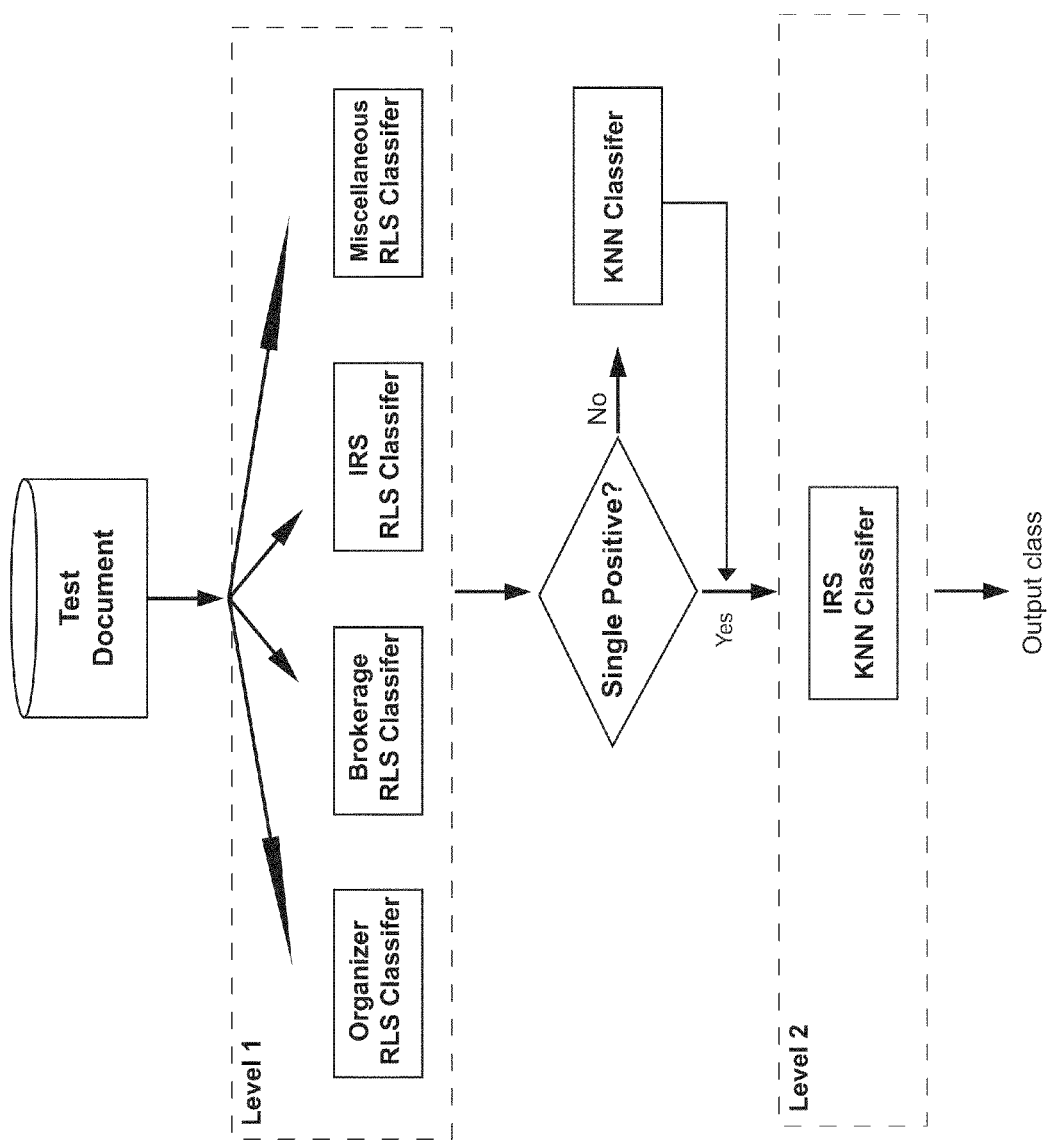
FIG. 15 is a flow diagram of a CRK classifier according to a preferred embodiment of the disclosed subject matter.
Figure 16:
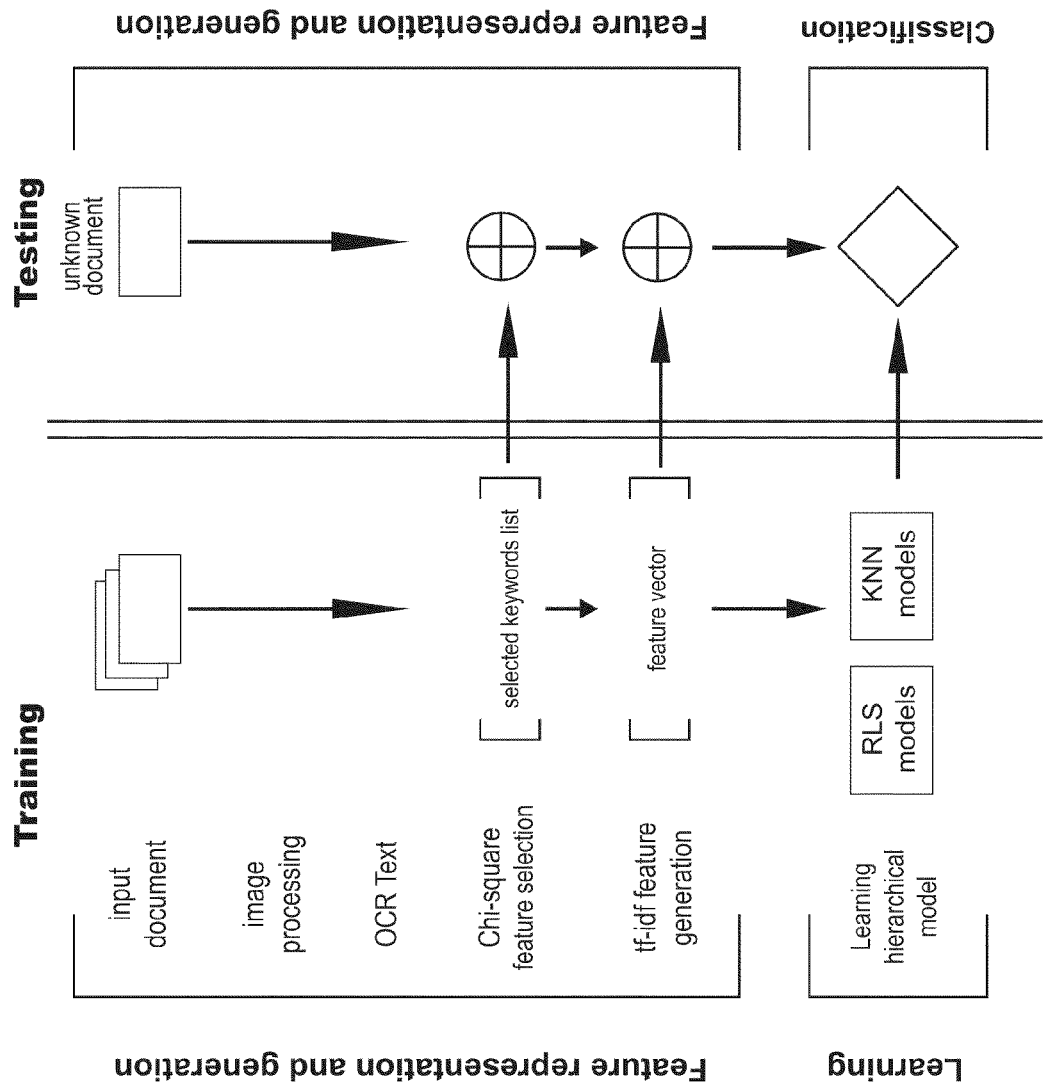
FIG. 16 is a schematic of a CRK classifier according to a preferred embodiment of the disclosed subject matter.

In the second case, the CRK classification subsystem, the class identification system 630 first identifies a source document as a member of a particular group of classes then identifies the source document as a member of a particular individual class. The CRK class identification system 630 performs hierarchical classification with a binary classifier system using regularized least squares and a multi-class classifier using K-nearest neighbor. An example flow diagram of an example CRK class identification system 630 used in classifying income tax documents is shown in FIG. 15.

In the third case, the SVM classification subsystem, the class identification system 630 identifies a source document using a support vector machine operating on a set of trained data If the lookup fails, the source document is marked as unclassified.

In the fourth case, the CCS classification subsystem, the class identification system 630 works much like the CTI class identification system 630. The CCS class identification system 630 compares the code vectors for each quadrant of source documents with code vectors in the trained class database 632 using the K-means approach. The trained class database 632 is organized into clusters representing documents in the training set with similar image properties as defined by the feature vectors. The mean point of each cluster within the feature vector space is used to represent each cluster. In addition, each cluster is tagged with all document classes that occurred within the cluster. The distance of the feature vector of a source document from the mean of each cluster is computed, and the K nearest clusters are considered.

The document class tags of these clusters are chosen as plausible classes of the source document.

The CCS trained class database 632 stores code vectors of all the trained forms, all of which are created by the CCS class training system 634.

System 632 is a trained class database. Trained class database 632 is used to support both the processing of jobs and the class training system 634. Trained class database 632 can be a file system, a relational database, a XML document or a combination of these. In preferred implementations, the trained class database 632 uses a file system to store large blobs (binary large objects) and a relational database to store pointers to the blobs and other information pertinent to processing the job. As the system grows "smarter" by recognizing more documents, the trained class database 632 grows. As the machine learning system sees more classification data, its classification accuracy increases.

System 634 is a class training system. The class training system 634 adapts to a growing set of documents; additional documents add additional features that must be analyzed. Preferred implementations of the class training system 634 include tuning and optimization to handle noise generated during both the training phase and the testing phase. The training phase is also called learning phase since the parameters and weights are tuned to improve the learning and adaptability of the system by fitting the model that minimizes the error function of the dataset.

The learning technique that is used to bootstrap the system in the preferred implementation is supervised learning. Applications in which training data comprises examples of input vectors along with their corresponding target vectors are known as supervised learning problems. Example input vectors include key words and line patterns of the document layouts. Example target vectors include possible classes of output in the organized document. Supervised learning avoids the unstable states that can be reached by unsupervised learning and reinforcement learning systems.

To maintain the system, semi-supervised learning is utilized. In the preferred implementation, data that is flowing through the system is analyzed and those data that the system failed to correctly identify are isolated. These data are passed through a retraining phase, and the training data in the system are updated after appropriate regression testing.

In high volume, a fully automated process is utilized. Here, the data that is needed for retraining are automatically identified and fed to the retraining phase. The new training data are automatically injected into a regression test system to ensure correctness. If the regression test passes, the production system is automatically updated with the new training data.

The learning system receives documents from the trained class database 632. These documents are not trained and do not have corresponding classification model data in the class database. All such documents are made persistent in the trained class database 632.

The trained class database 632 has several tables which contain the document class information as well as image processing information (which is discussed in greater detail below.) The following tables are part of training database:
  Form class (classification view)
  Page table (details of the page of the electronic document)
  Manual classification table (manual work information)
  Manual training table (trainers' information)
  Confetti table (confetti information, original text, corrected text, etc.)

Class training system 634 utilizes a training process management system that manages the distribution of the training task. Under preferred embodiments, a user, called a "trainer," logs into the system in which the trainer has privileges at one of three trainer levels:
  Top tier: add new classes to the system and perform classification and training
  Middle tier: perform manual classification and training
  Bottom tier: only perform training (manual text correction).

The training process manager directs document processing based on the document state:
  Unclassified page is scheduled for manual classification
  Manual classification is done as per policy and form class is assigned
  Job database is updated with form class information and page/job states are changed so that the page can go to next state
  If the form class state is not trained, the form is scheduled for training, else no action is needed After form training, the form class state is changed to trained, not synched if allowed by policy. The document class has the following states:
  Untrained
  Partially trained
  Trained, need synch with classification database
  Trained, synched with classification database Each document that requires training is manually identified and the extracted text is corrected as needed. The trainer follows two independent steps:
  Manually classifying the form and assigning a class and subclass
  Manually correcting text extracted by OCR (name required training for now)

Manual identification and text correction is comprised of a number of steps:
  Receive pages from the training manager which manages the flow of pages between various trainers and implements training policy and restrictions
  Manual classification user interface (UI) which presents the page and asks the user to classify it
  Manual text correction UI which presents the page with marked up confetti; the user views the confetti and corrects the text extracted from the confetti
  Training viewer UI is used to view the training database in an UI; the preferred implementation includes reports and representations of the training database
  Classification verification UI presents a page and its classification to a trainer
  All user interfaces are integrated into a single system.

The class training system 634 combines the document image, the manually classified information and the corresponding text.

New trained data that passes regression testing is inserted by the class training system 634 into the trained class database 632.

In the case of the CRK class training system 634, Ch-square feature selection attempts to select the most relevant keywords (bag-of-words) for each class $$\chi^2 = \frac{N(AD-BC)^2}{(A+C)(B+D)(A+B)(C+D)}$$

Where
A=number of times word t co-occurs with class c
B=number of times word t occurs without class c
C=number of times class c occurs without word t D=number of times neither word t nor class c occur
N=total number of words This approach ranks the relevance of each word for a particular class so that a sufficient number of features are obtained.

Term frequency—inverse document frequency is used to represent each document:

$$tf_i = \frac{n_i}{\sum_k n_k}, \quad idf_i = \log\frac{|D|}{|\{d : d \in t_i\}|}$$

Where
$n_k$=number of occurrences of feature keyword i $$\sum_k nk = \text{number of occurrences of all terms in the document}$$

|D|=total number of documents in the data
|D|{d:d ∈ t}|=total number of documents in the data
Each vector is normalized into unit Euclidean norm.

In the tax document classification example shown in FIG. 15, using these features, four regularized least square classifiers are trained for organizer, brokerage, IRS and misc categories at level 1. Finally, a KNN classifier is used to refine the IRS classes. The cosine distance is used as a similarity measure.

System 640 is a voting system. The voting system 640 uses the output of each of the classifier subsystems 630 to choose the best classification result for an image, based on empirical observations of each classifier subsystem behavior on a large training dataset. These empirical observations are encoded into a trained voting decision tree 642. The voting system 640 uses the trained voting decision tree 642 to choose the final classification of an image. The trained decision tree 642 is built using the voting training system 644.

System 642 is a trained voting decision tree. The trained voting decision tree 642 is used to support the voting system 640. Trained voting decision tree 642 can be encoded as part of a program, file, relational database, XML document or a combination of these. In preferred implementations, the trained voting decision tree 642 is encoded as a program within a decision making process. As the system grows "smarter" by recognizing more images, the trained voting decision tree 642 evolves, resulting in a system with increasing image identification accuracy.

System 644 is a voting training system. The voting training system 640 considers the real classifications of a training dataset and the respective outputs of each of the classifier subsystems 630. Using this data, the voting training system 640 builds a decision tree, giving appropriate weights and preference to the correct results of each of the classification subsystems 630. This approach results in maximized correctness of final classification, especially when each classification subsystem 630 is adept at classifying different, not necessarily disjoint, subsets of documents.

Figure 7:
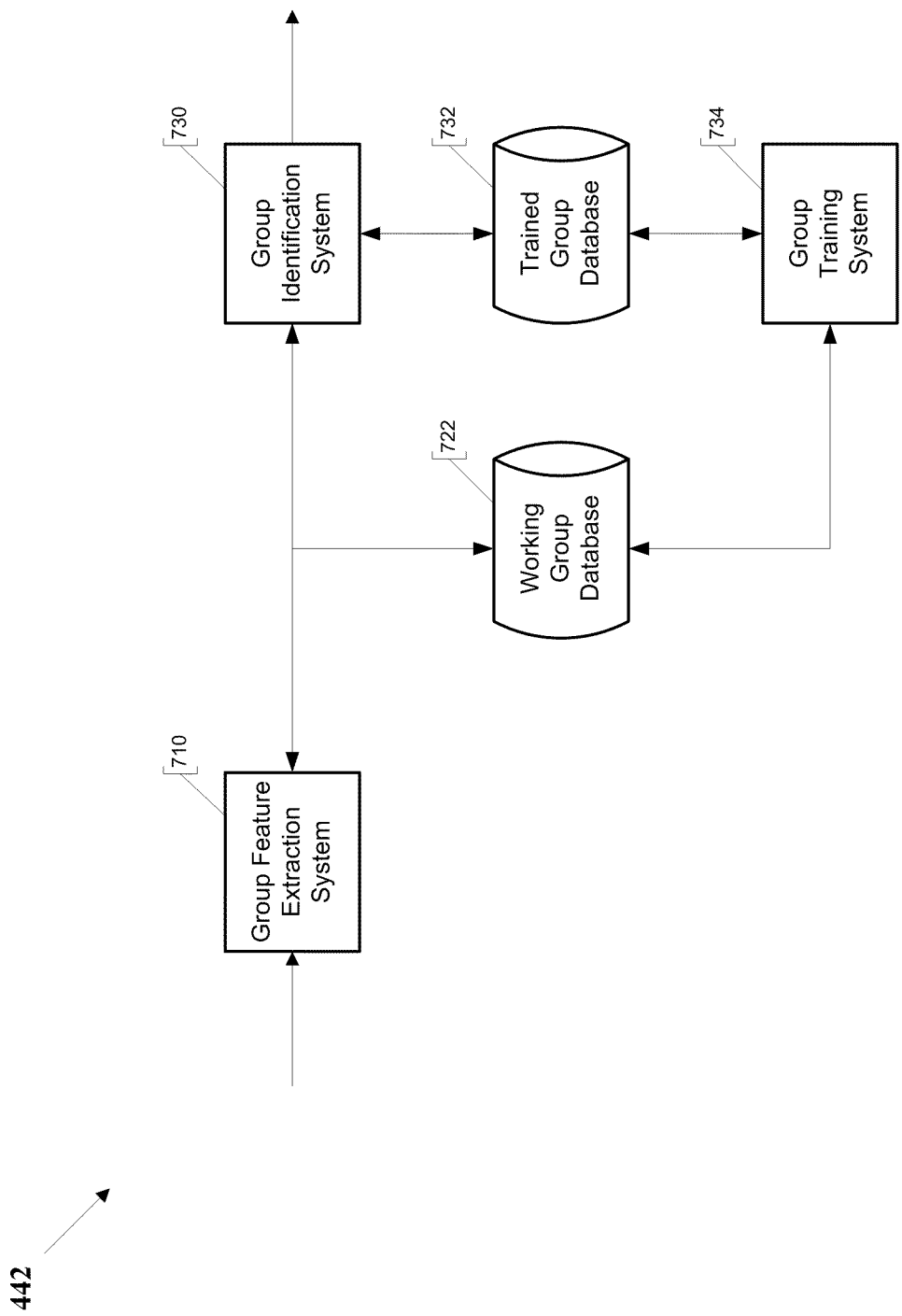
FIG. 7 is a system diagram of the grouping system 442 according to a preferred embodiment of the disclosed subject matter.

FIG. 7 is a grouping system 442 according to a preferred embodiment of the invention. System 442 has a group feature extraction system 710, a working group database 722, a group identification system 730, a trained group database 732 and a group training system 734. The group feature extraction system 710 is connected to the working group database 722 via software within a computer system. The group feature extraction system 710 is connected to the group identification system 730 via software within a computer system. The group identification system 730 is connected to the working group database 722 via software within a computer system. The group identification system 730 is connected to the trained group database 732 via software within a computer system. The group training system 734 is connected to the working group database 722 via software within a computer system. The group training system 734 is connected to the trained group database 732 via software within a computer system.

System 710 is a group feature extraction system. Group feature extraction system 710 receives document information including the class identifier and text data for each page. System 710 identifies data features that potentially indicate that a page belongs to a document set. The preferred implementation identifies page numbers and account numbers.

System 722 is a working group database. Working group database 722 is used to support both the processing of jobs and the group training system 734. Working group database 722 can be a file system, a relational database, a XML document or a combination of these. In preferred implementations, the working group database 722 uses a relational database to store pointers to the information pertinent to processing the job.

System 730 is a group identification system. Group identification system 730 utilizes the class identifier, the page numbers and the account numbers extracted by system 710 to group pages of a job that belong together. The preferred implementation uses an iterative grouping process that begins by assuming that all pages belong to independent groups. At each iteration step, the process attempts to merge existing groups using a merging confidence. The process terminates when group membership converges and there is no further change to the set of groups.

The group identification system 730 uses a merging confidence that is determined from matching and mismatching criteria that is stored in the trained group database 732. Matching criteria between two groups contribute towards an increased confidence to merge the groups, while mismatching criteria contribute towards keeping the groups separate. The final merging confidence is used to decide whether to merge the two groups. This process is repeated for every pair of groups, in each iteration step of the process.

System 732 is a trained group database. Trained group database 732 is used to support both the processing of jobs and the group training system 734. Trained group database 732 can be a file system, a relational database, a XML document or a combination of these. In preferred implementations, the trained group database 732 uses a file system to store large blobs (binary large objects) and a relational database to store pointers to the blobs and other information pertinent to processing the job. As the system grows "smarter" by recognizing more document group data, the trained group database 732 grows. As the machine learning system sees more data, its group identification accuracy increases.

System 734 is a group training system. The group training system 734 extracts matching criteria from a large set of correctly grouped documents and adapts to a growing set of document data. Preferred implementations of the group training system 734 include tuning and optimization to handle noise generated during both the training phase and the testing phase. The training phase is also called learning phase since the parameters and weights are tuned to improve the learning and adaptability of the system by fitting the model that minimizes the error function of the dataset.

Figure 8:
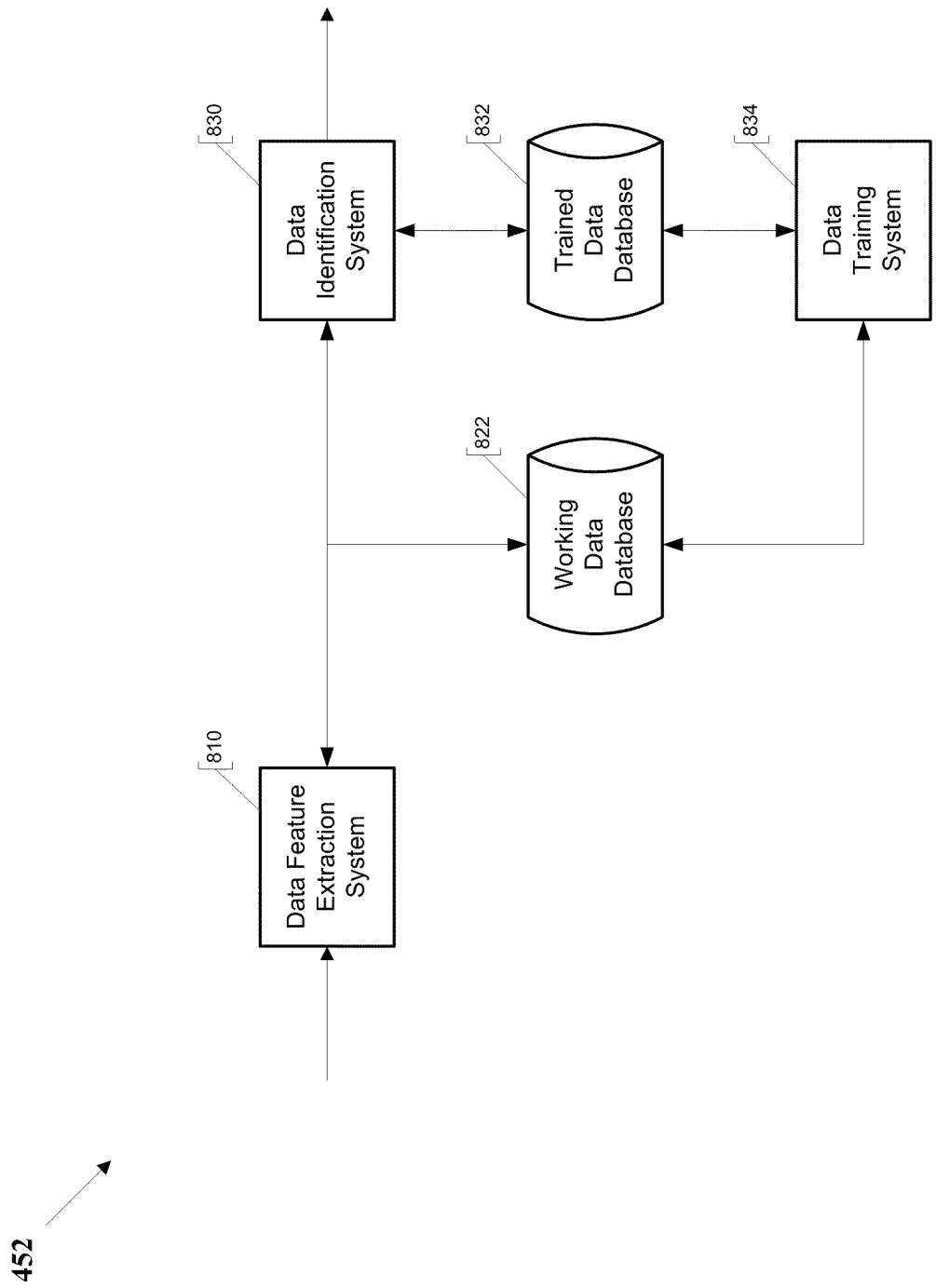
FIG. 8 is a system diagram of the data extraction system 452 according to a preferred embodiment of the disclosed subject matter.

FIG. 8 is a data extraction system 452 according to a preferred embodiment of the invention. System 452 has a data feature extraction system 810, a working data database 822, a data identification system 830, a trained data database 832 and a data training system 834. The data feature extraction system 810 is connected to the working data database 822 via software within a computer system. The data feature extraction system 810 is connected to the data identification system 830 via software within a computer system. The data identification system 830 is connected to the working data database 822 via software within a computer system. The data identification system 830 is connected to the trained data database 832 via software within a computer system. The data training system 834 is connected to the working data database 822 via software within a computer system. The data training system 834 is connected to the trained data database 832 via software within a computer system.

System 810 is a data feature extraction system. The data feature extraction system 810 constructs an Image Form Model, which is a working representation of the layout of the confetti and text in the document image. The data feature extraction system 810 identifies layout features that potentially carry data. The preferred implementation identifies boxes (illustrated in FIG. 19), check boxes (illustrated in FIG. 20), text, lines and tables. The Image Form Model also contains references to the image features like lines and points that have been identified earlier.

The data feature extraction system 810 identifies canonical labels that occur in an image by searching through the extracted text data for corresponding expected labels. In order to be robust to OCR errors, data feature extraction system 810 utilizes inexact string matching algorithms that use Levenshtein distance to identify expected labels. An iterative technique that uses increasingly inexact string comparison on an increasingly narrower search space is utilized. If certain canonical labels are still not found because of severe OCR errors, image identification system 530 is used to find canonical labels using contour matching. The success of this technique is enhanced by the narrowed search for the corresponding missing expected labels.

The data feature extraction system 810 identifies data-containing features including boxes, real and virtual, check boxes, label-value pairs, and tables. The data feature extraction system 810 also identifies formatted data that are often not associated with a label, e.g. address blocks (illustrated in FIG. 21), phone numbers and account numbers. The data feature extraction system 810 also identifies regions of text that are not associated with any data, such as disclaimers and other text blocks that contain instructions for the reader rather than extractable data (referred to as instruction blocks and illustrated in FIG. 22).

System 822 is a working data database. Working data database 822 is used to support both the processing of jobs and the data training system 834. Working data database 822 can be a file system, a relational database, a XML document or a combination of these. In preferred implementations, the working data database 822 uses a file system to store large blobs (binary large objects) and a relational database to store pointers to the blobs and other information pertinent to processing the job.

The working data database 822 consists of a flexible data structure that stores all of the features that the data feature extraction system 810 identifies along with the spatial relationships between them. The most primitive element of the data-structure is a Feature data-structure, which is a recursive data-structure that contains a set of Features. A Feature also maintains references to nearby Features; in the preferred implementation, four sets that correspond to references to Features above, below, to the left, and to the right of the Feature. A Feature provides iterators to traverse the five sets associated with it. A Feature also provides the ability to tag on a confidence metric. In the preferred implementation, the confidence is an integer in the range [0-100]. It is assigned by the algorithms that create the Feature, and is used as an estimate of the accuracy of the extracted data.

The primitive Feature data-structure is sub-classed into specific features. At the lowest level are the primitive features confetti, word, line, point. At the next level are label and value. Finally, there are features corresponding to each of the data-containing features, box, check-box, label-value pair, and table. There also are features corresponding to the elements of certain composite features like table headers, table rows, and table columns. There are also features corresponding to form-specific items such as address blocks, phone numbers, and instruction blocks.

The Feature data-structure supports operations to merge a set of features into another. For example, a label feature and a value feature that correspond to each other are merged into a Label-value pair feature. A set of value features that have been identified as a row of a table are merged into a row feature. A set of labels that have been identified as a table header are merged into a table header feature. In each of these cases, the set of features that were merged into the result are all contained within. They are accessed by enumerating the contained features. As with any feature, the respective algorithm can assign a confidence to the merged feature.

System 830 is a data identification system. Data identification system 830 utilizes the Image Form Model created by system 810 to search for correlations between labels and values. The preferred implementation uses the classification of a particular page to determine the expected labels. The expected label set is a subset of the universe of labels, which is available in the trained data database 832. System 830 uses the expected label set to search for data in the image form model for the image. The layout features that have been identified in System 810 are used to aid the process of correlating labels with data.

Figure 17:
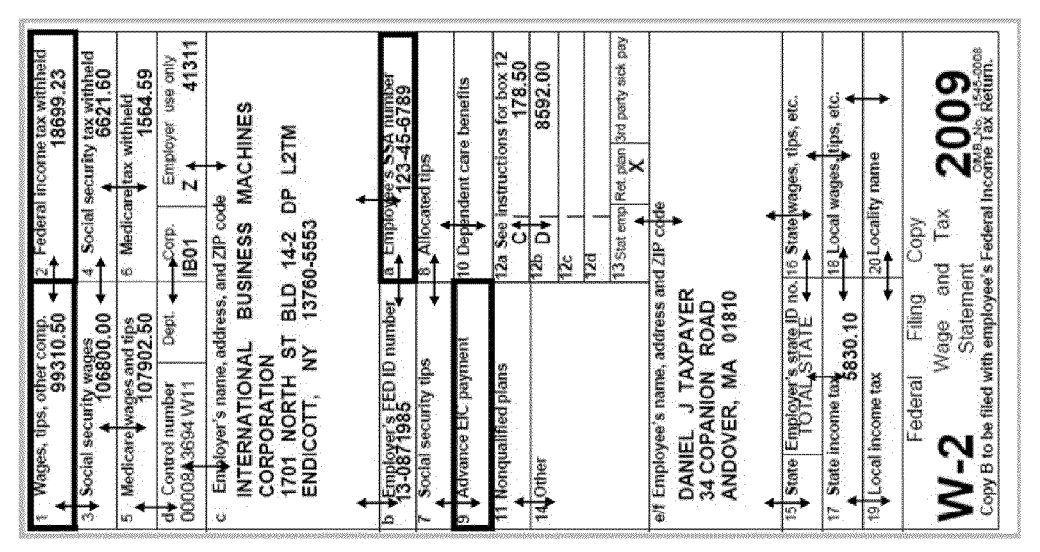

The data identification system 830 performs relative location matching by comparing the locations of the identified confetti images with locations of unidentified confetti images, both stored in the working data database 822. FIG. 17 illustrates relative matching of labels.

The preferred implementation of data identification system 830 includes the ability to handle errors and noise. In some situations, poor image quality results in certain expected labels to be missing. Data identification system 830 uses relative location matching by comparing the relative location of identified labels and unidentified text in the image form model, with learned data in the trained data database 832.

Figure 24:
FIG. 24 is an illustration of a multi-copy form.

Some images include multiple copies of form data. For example, in the image of a Form W-2 shown in FIG. 24, the data to be extracted is repeated four times. FIG. 50 illustrates four "Wages, tips, other comp." boxes that appear on a W-2 form; FIG. 51 show the corresponding data record. The data identification system 830 improves the accuracy of data extraction by utilizing each copy of data on an image with the following process for extracting data from multi-copy forms:
1. Identify if the image is a multi-copy form.
2. Extract data as with a single-copy form to get sets of canonical label-value pairs.
3. Group the extracted data into records corresponding to the layout of the multiple copies in the image:
   a) Count the number of occurrences of each canonical label extracted in step 2.
   b) The maximum number of occurrences m determined in step 3a is the number of records.

c) Create the m records.

d) Seed each record with the corresponding canonical label-value pairs that determined the number of records.

e) Set the boundary of each of the records to be the rectilinear convex hull of the canonical label-value pair that seeded it.

f) Add the remaining extracted canonical label-value pairs to the records:

(i) Sort all canonical label value pairs extracted in raster order.

(ii) For each canonical label value pair not yet added to a record

If the canonical label value pair is enclosed by the record;

Add the canonical label-value pair to the record;

Continue.

Otherwise

Add the canonical label value pair to a nearby record;

Extend the boundary of the record to be the rectilinear convex hull of the record and the new canonical label-value pair.

If the resulting boundary intersects with another record, backtrack and then add the canonical label-value pair to the next record.

After the above process, data identification system 830 organizes the data extracted from such multi-form images into a set of m records as indicated by the layout. Accuracy of extracted data is improved by using a voting strategy to determine which of the m extracted data to select. In addition, if all extracted data instances are identical, then the extracted data is considered to be correct with high confidence. Conversely, if extracted data instances are different, then the extracted data is flagged.

The data identification system 830 extracts data from tables (illustrated in FIG. 23) using a layout based strategy. The strategy addresses the following problems with extracting data from tables.

1. Table headers often have poor OCR relative to the actual data in the tables.

This means that it is often the case that the values can be correctly determined by the machine, but the corresponding label cannot.

2. Table formats change.

3. A single table row can span multiple text lines in the image. Conventional approaches to extract tables do not handle such wrapped tables in a robust manner.

4. Tables are often interspersed with instruction blocks, aggregate rows, incomplete rows, and overlapping columns.

5. An image with localized noise can still contain large amounts of extractable table data.

The process for extracting tables is given below:

1. Start with the image as confetti (FIG. 25-A).

2. Find neatly aligned columns, which are a set of vertically aligned confetti

3. Identify labels in the image, then consume all confetti within the label area (FIG. 25-B).

4. Identify potential table headers by grouping labels horizontally, consume all confetti in the header area (FIG. 25-C).

5. Remove instruction blocks from consideration. These areas do not correspond to any extractable data and are identified using heuristics associated with text density, font size and font type (FIG. 27).

6. Remove noisy confetti (confetti with poor OCR, overlaid text, and other situations where the data is bad or does not exist) (FIG. 28).

7. Form horizontal projections of the remaining confetti. Use the gaps in the projection data to identify rows (FIG. 29).

8. Collect rows that are in close proximity as candidate table formations.

9. Grow columns within each candidate table formation using gaps in their vertical projections until an obstruction is hit. Break the table formation at that point (FIG. 30).

10. Associate the table formation with a header if possible (FIG. 31).

11. Associate each column with a label.

12. Identify missing labels by matching the pattern of labels to those in the trained data database 832 (FIG. 32).

The data identification system 830 handles wrapped columns as a special case. In step 8 above, if tables break repeatedly at a row count of one, then the rows are partitioned into two sets, the odds and evens. Now steps 7 through 11 operate on each of the two sets to get two interleaved tables. These two interleaved tables are merged to form the extracted table.

System 832 is a trained data database. Trained data database 832 is used to support both the processing of jobs and the data training system 834. Trained data database 832 can be a file system, a relational database, a XML document or a combination of these. In preferred implementations, the trained data database 832 uses a file system to store large blobs (binary large objects) and a relational database to store pointers to the blobs and other information pertinent to processing the job. As the system grows "smarter" by recognizing more document data, the trained data database 832 grows. As the machine learning system sees more data, its data identification accuracy increases.

The trained data database 832 contains information that is used to extract data. The trained data database 832 includes:

1. For each type of form, a set of canonical labels associated with each data element that should be extracted from that type of form. Examples of canonical labels for a Form W-2 include the Social Security Number, Taxpayer Name, Wages, and Federal Income Tax Withheld.

2. For each canonical label, a set of expected labels that correspond to learned variations of the canonical label. Examples of variations in expected labels for the Social Security Number canonical label are Social Security Number, Soc. Security No. and SSN.

3. For each type of form, the learned variations in the relative locations of expected labels.

4. For each type of form, the learned variations in the types of data containing features that may occur. The data containing features include boxes, virtual boxes, check boxes, text, lines, and tables.

System 834 is a data training system. The data training system 834 adapts to a growing set of document data; additional document data add additional features that must be analyzed. Preferred implementations of the data training system 834 include tuning and optimization to handle noise generated during both the training phase and the testing phase. The training phase is also called learning phase since the parameters and weights are tuned to improve the learning and adaptability of the system by fitting the model that minimizes the error function of the dataset.

Figure 33:
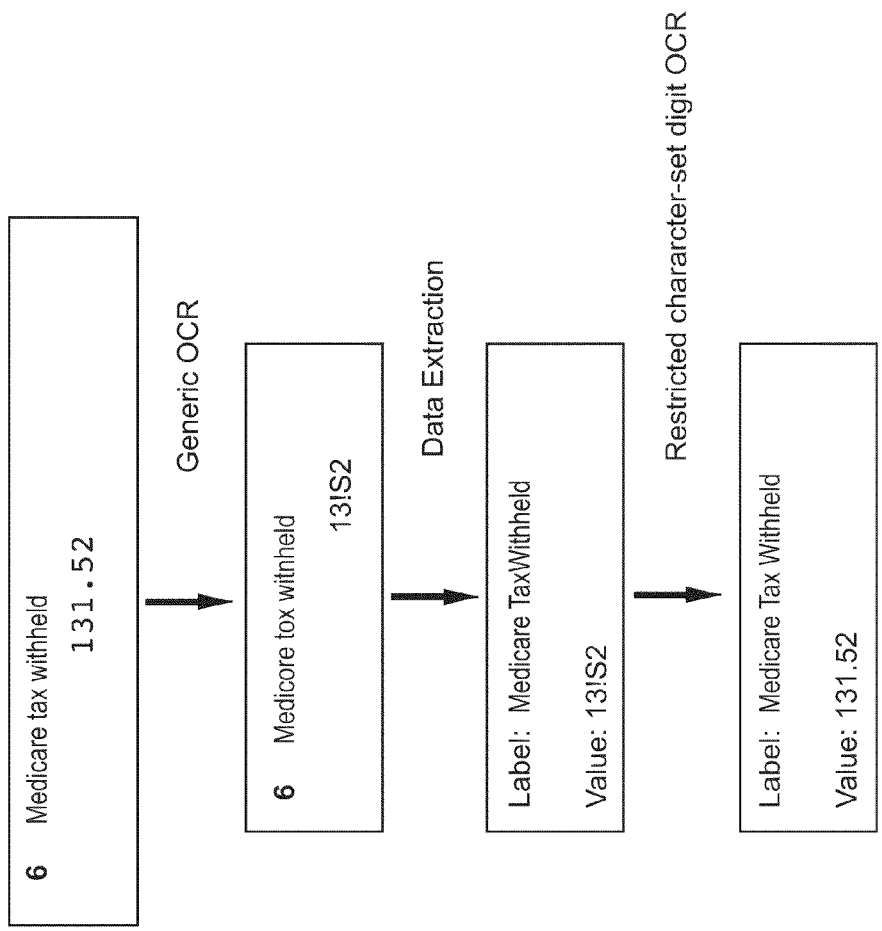
FIG. 33 is an illustration of the an image being extracted via a process of progressive refinement and reduced character set OCR.

The invention extracts data from an image via a process of progressive refinement and reduced character set OCR (as illustrated in FIG. 33) in order to overcome the imperfections of OCR or low quality documents. The scanned image is processed by generic OCR which, in this example, produces errors in both the label portion and the value portion of the box. However, using standard techniques, the OCR output for the label portion is correctly identified as "Medicare Tax Withheld". In this example, the value related to the identified label is known to be a monetary amount, so the part of the image that corresponds to the value is reprocessed by a restricted-character-set OCR. This OCR process is trained to identify only the characters possible in a monetary amount, i.e. the digits [0-9], and certain special characters [$,. ( )-]. The reduced search space greatly increases the accuracy of the restricted-character-set OCR output, and it produces the correct value of 131.52.

Figure 34:
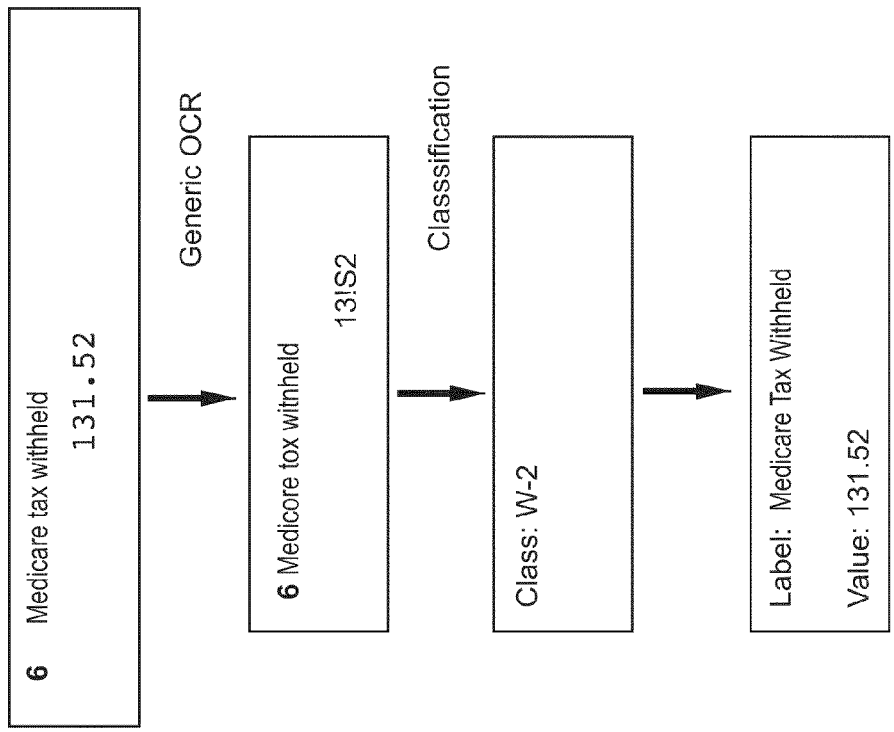
FIG. 34 is an illustration of the an image being extracted via a process of progressive refinement based on increasing knowledge about the form.

The invention extracts data from an image via a process of progressive refinement that utilizes a reduced search space as more is learned about the form being extracted (as illustrated in FIG. 34). In the example shown in FIG. 34, poor OCR is used to identify the correct label. First, the OCR output is used to identify the class of the form because classification process is very robust to poor OCR. After the form has been determined to be, for example, a W-2, the label search is constrained to only the labels that are expected in W-2 forms. This greatly reduces the search space, and therefore increases the accuracy of extraction.

In general, as more information is known about a form, constraints are added to reduce the search space. This reduction in search space permits prior processes to be rerun, significantly improving the overall extraction accuracy.

The invention extracts data from an image via a process of progressive refinement that utilizes data external to the form image being extracted (as illustrated in FIG. 35). In the example shown in FIG. 35, data that was extracted from the 1099-OID form is used to extract data from the 1099-G form. The Recipient's identifier number of the 1099-G form is light and washed out, and results in poor OCR output. In this example, the two forms are in the same job, and they both have the same Recipient's name (John Smith). The Recipient's identification number on the 1099-G form can be inferred to be 432-10-9876, the same as the Recipient's identification number on the 1099-OID form.

The invention extracts data from an image via a process of progressive refinement that utilizes data not extracted from any image (as illustrated in FIG. 36). In the example shown in FIG. 36, data that is available in a "pro-forma" file is used to identify data on a form. The pro-forma file contains taxpayer information from the previous year's tax return that has been quality checked, including the taxpayer name, taxpayer Social Security Number, spouse name, spouse Social Security Number, dependent names and Social Security Numbers, and other information about the tax forms included in the previous year's tax return. All this information is available to the data extraction process, and is assumed to be accurate. The pro-forma external data enables the verification and correction of low-confidence OCR-extracted data.

The invention utilizes a set of known-value databases to augment the results of conventional data extraction methods such as OCR. The know-value databases are obtained from vendors or public sources; the known-value databases are also built from data extracted from forms that have been submitted by users of the data extraction system. Known-value databases, for example, contain information on employers, banks and financial institutions and their corresponding addresses and identification numbers. FIG. 37 shows a 1099-G form in which the payer's name is struck out, making it difficult to OCR correctly. As can be seen in FIG. 38, the payer's name has not been extracted because of the missing label. A known-value database of the issuers of 1099-G forms (which are the revenue departments of the 50 states) provides the payer's name by a simple lookup. This finding is verified by comparing the lookup results against the relevant OCR output.

Figure 39:
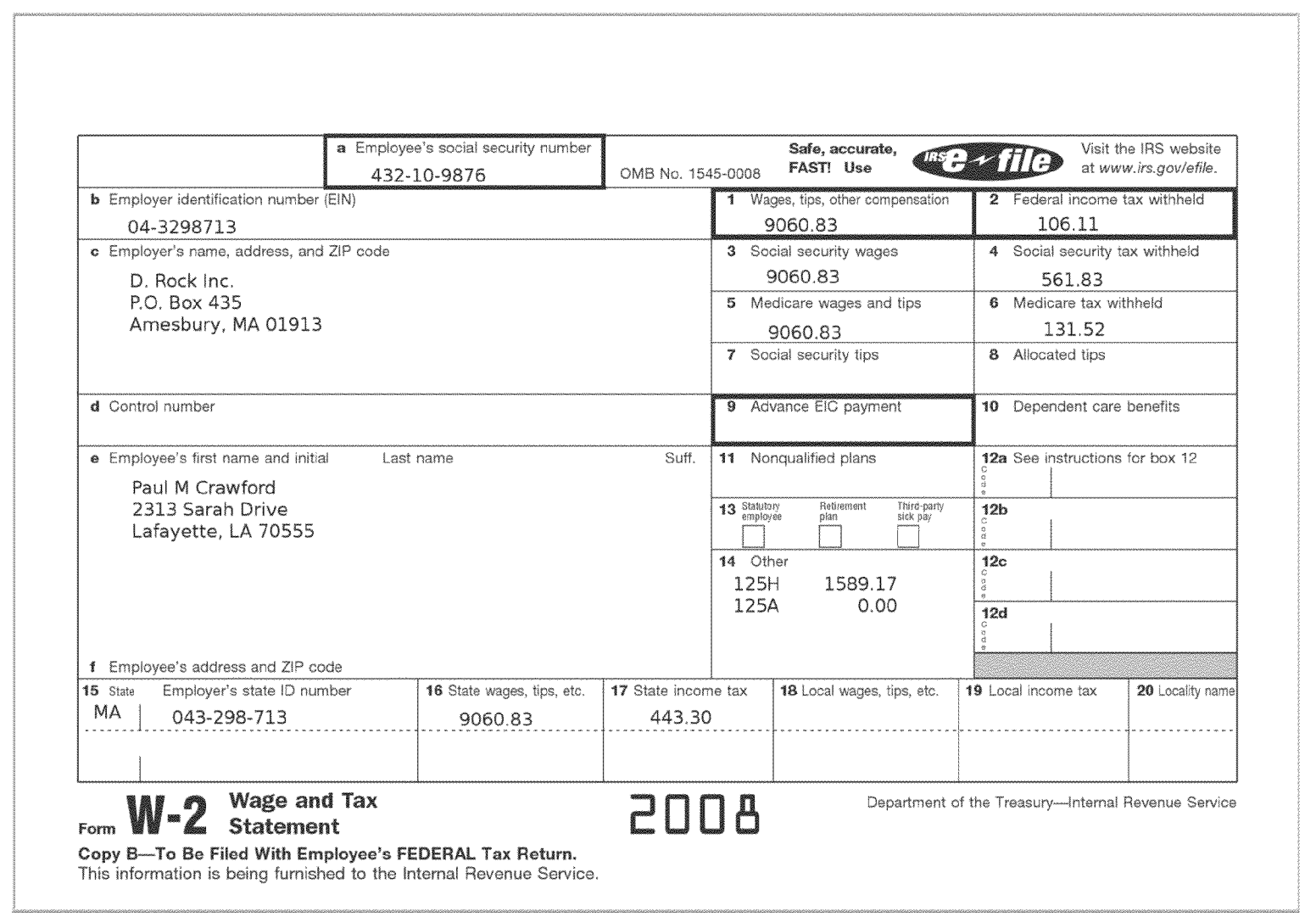

The invention utilizes known constraints between the semantics of extracted data elements to identify potentially incorrectly extracted data. The constraints are specified by subject matter experts (for example, bankers in the case of loan origination forms); the constraints are also determined by analysis of data extracted from forms that have been submitted by users of the data extraction system. For example, FIG. 39 is an image of a W-2 form with a faded digit in the value for box 1 "Wages, tips and other compensation." As shown in FIG. 40, the extracted value corresponding to the "Wages, tips and other compensation" label is 060.83 (versus the correct value of 9060.83.) The extracted value is flagged as incorrect when comparing it to the extracted value for Federal income tax withheld (106.11). The constraints for a W-2 form specify that Federal income tax withholdings cannot exceed total wages.

The invention utilizes known constraints between the semantics of extracted data elements to correct potentially incorrectly extracted data. The constraints are specified by subject matter experts (for example, Certified Public Accountants in the case of income tax forms); the constraints are also determined by analysis of data extracted from forms that have been submitted by users of the data extraction system. In the above example illustrated in FIG. 39 and FIG. 40, the constraints for a W-2 form specify that, for wages below a threshold amount, in most cases "Wages, tips and other compensation" is equal to "Social security wages" and "Medicare wages and tips." In this example, the constraints indicate that when "Wages, tips and other compensation" is flagged as incorrect and differs by a single digit from "Social security wages," then the value from "Social security wages" replaces the value of "Wages, tips and other compensation."

The invention utilizes known constraints in the layout of data elements, to narrow the search space and thereby more accurately extract data. The layout constraints are specified by technical experts; the constraints are also determined by analysis of data extracted from forms that have been submitted by users of the data extraction system. FIG. 41 illustrates the relationship of layout elements in a portion of a W-2 form. In FIG. 41, for example, the label "Social security wages" is to the left of the label "Social security tax withheld." This layout relationship and others, specified by experts or determined by analysis, are used to infer missing labels and also identify spurious data such as pencil marks, tick marks and other noise.

The invention predicts occurrences of instruction blocks based on detected layout patterns from forms that have been submitted by users of the data extraction system. The invention eliminates such instruction blocks from further data extraction, thus simplifying the extraction process and thereby improving the accuracy of data extraction.

The invention detects tables using column layout and the expected header layout based on detected layout patterns from forms that have been submitted by users of the data extraction system. Known constraints, in the form of relationships between header elements, are used to predict headers when not correctly detected.

The layout of multiple occurrences of a particular extracted artifact, e.g. four occurrences of each expected data element in a W-2, is used to identify the four logical records in the W-2.

The mechanism that was used to identify a particular data artifact, e.g. label identified by correct OCR text vs predicted label, is used to attach a confidence to the extracted data.

Figure 42:
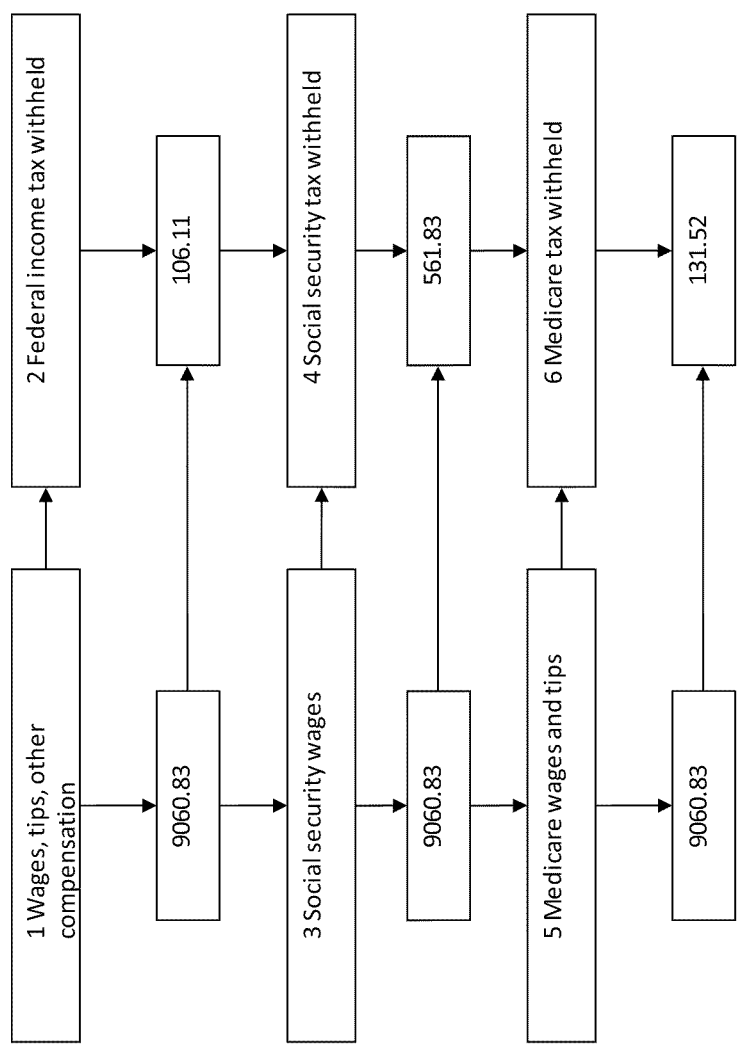
FIG. 42 is an illustration of the internal representation of the data corresponding to the form in FIG. 41 as a partial layout graph.
Figure 43:
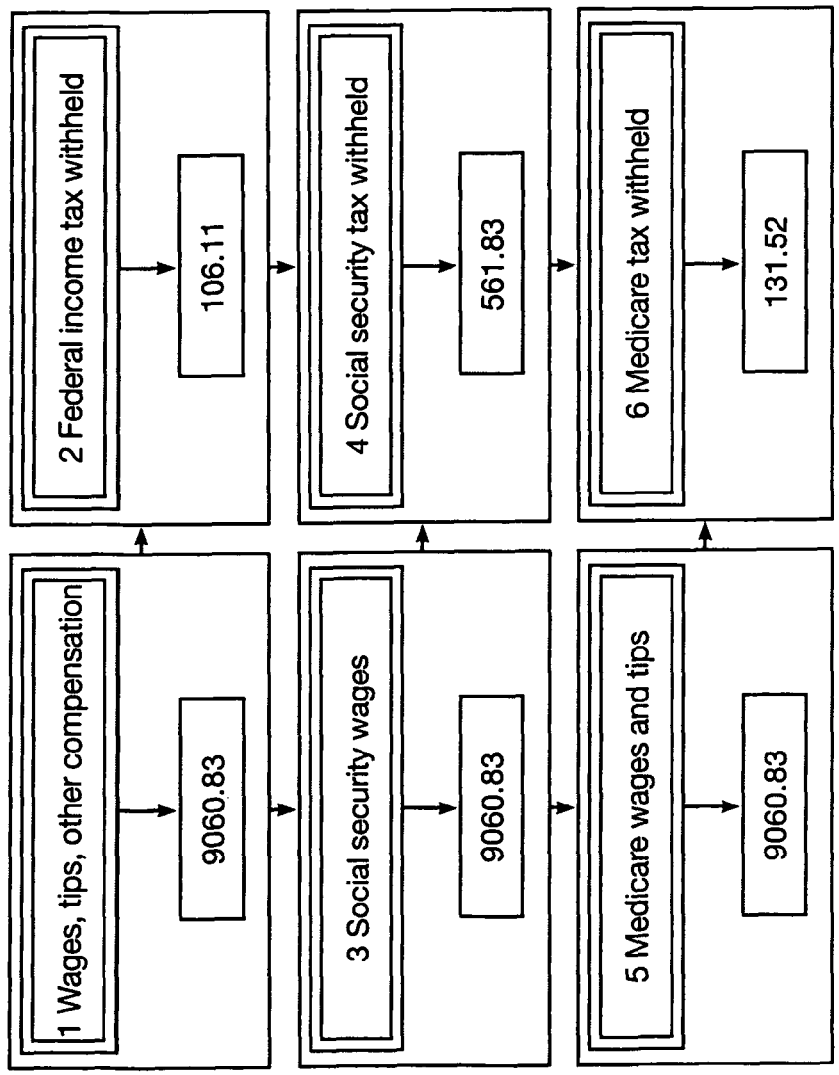
FIG. 43 is an illustration of the internal representation of the data corresponding to the form in FIG. 41 after labels are detected.

1. Infer labels
2. Identify instruction blocks, pencil marks, other "noise" etc. and eliminate from search space
3. Map canonical and detected labels
4. Detect tables
5. Record detection
6. Attach confidence to extracted data The invention utilizes layout data structure to extract data from form images. The use of a layout data structure is illustrated in the context of a portion of a W-2 form image shown in FIG. 41. First, the low-level layout graph of confetti is created; its internal representation is partially illustrated in FIG. 42. While the left, right, top, and bottom connection sets exactly map the layout, for brevity, only the right and down sets for each confetti is shown in FIG. 42. Second, labels are detected. Third, as illustrated in FIG. 43, the layout graph is modified by identifying the detected labels (shown as light grey blocks). Fourth, the label-value correlations are determined (shown by the dark grey blocks). Note that the illustration shows the right set of each of the features shown. Note also that the layout relations of the contained features do not cross out of the container; this aspect of the data structure significantly improves the efficiency of the data structure. Also shown are the down sets of each feature. The contained features can be seen to maintain layout relations within the container, leaving it to the container to maintain external layout relations.

The invention extracts data from an image via a process of progressive refinement that utilizes contours matching (as described above). While contour matching on its own is of limited value over a large universe of labels, coupled with the progressive refinement technique, contour matching is robust. As an example, the labels from the 1099-OID form of FIG. 35 are shown in FIG. 44. Since there is significant similarity between the contours for "PAYER's federal identification number" and "RECIPIENT's federal identification number," it is inappropriate to differentiate these two labels using their contours. However, differentiating "RECIPIENT's name" from "PAYER'S name, street address, city, state, ZIP code and telephone no" is appropriate. Accordingly, contour matching is used in those cases in which the set of options is small.

The invention utilizes contour matching along with text-based label matching as part of the progressive refinement process. Once the 1099-OID form in FIG. 35 is correctly classified, for example, the search space for labels is restricted to labels that occur in a 1099-OID. As part of the progressive refinement process, in this example, all the labels except "RECIPIENT's name" and "Original Issue discount for 2009" were identified by text-based matching. Contour matching is then used to distinguish between these two labels.

Figure 13:
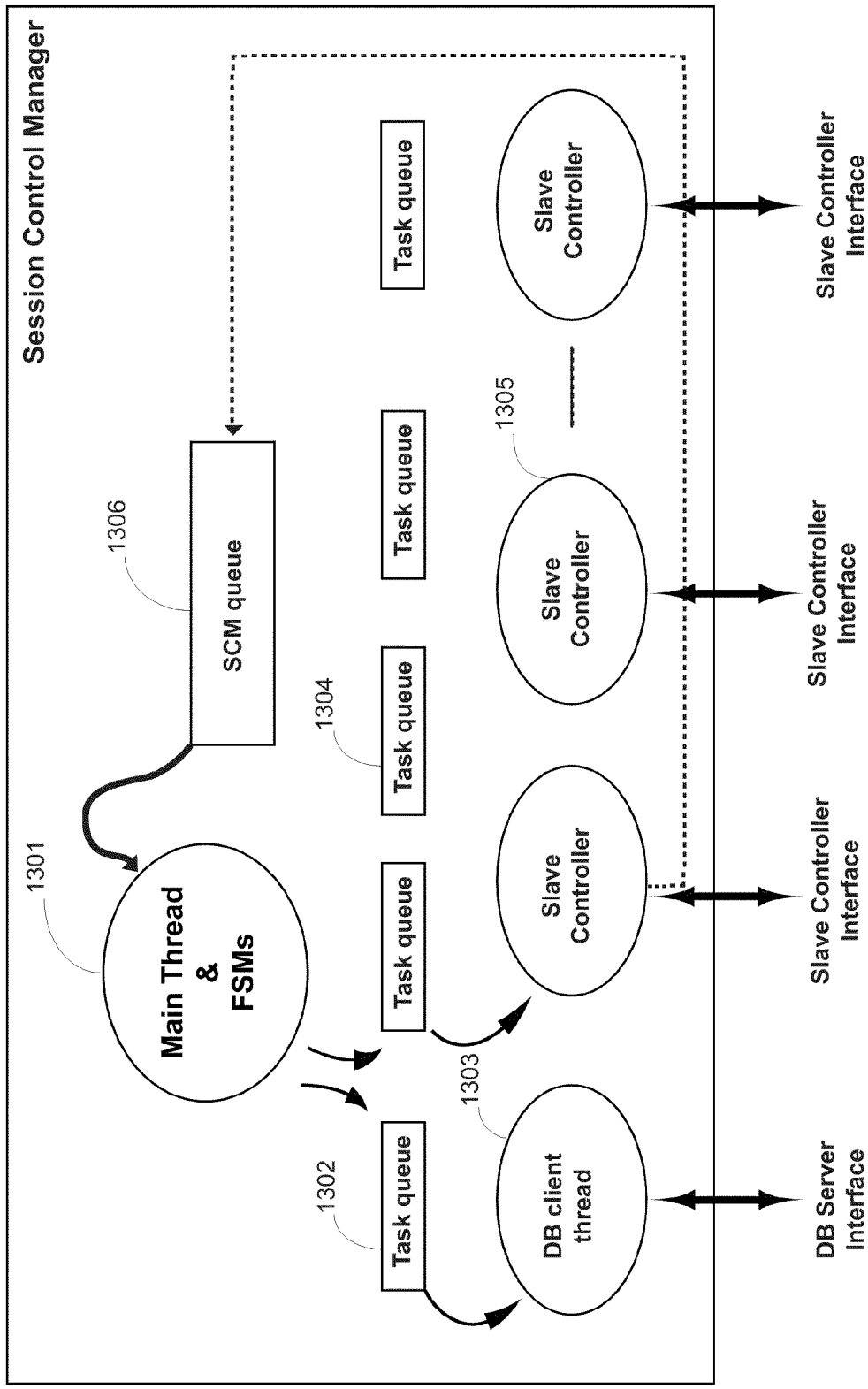
FIG. 13 is a flow diagram of the service control manager 410 according to a preferred embodiment of the disclosed subject matter.

FIG. 13 is a system diagram of the service control manager 410. System 410 has a main thread 1301, task queues 1302, database client thread controllers 1303, task queues 1304, slave controllers 1305 and SCM queue 1306.

The main thread 1301 controls the primary state machine for all the jobs in the system.

Task queues 1302 provide message queues for database communication.

Database client thread controllers 1303 manage the database server interface.

Task queues 1304 provide message queues for communication with slave controllers.

Slave controllers 1305 manage various slave processes via the slave controller interface.

The SCM queue 1306 provides a mechanism for the various controllers to communicate with the main thread.

In the preferred implementation, various threads communicate with each other using message queues. Whenever a new document is received for processing, the main thread is notified and it requests the database client thread to retrieve the job for processing based on the states and the queue of other jobs in the system.

In the preferred implementation, once the job is loaded in memory, a finite state machine for that job is created and the job starts to be processed. The main thread puts the job on a particular task queue based on the state machine instructions. For example, if the job needs to be image processed, then the job will be placed on the image processing task queue. If the slave controller for the image processing slave finds an idle image processing slave process, then the job is picked up from that queue and given to the slave process for processing. Once the slave finishes performing its assigned task, it returns the job to the slave controller which puts the job back on the SCM queue 1306. The main thread sequentially picks up the job from the SCM queue 1306 and decides on the next state of the job based on the finite state machine states. Once a job is completed, the finite state machine for the job is closed and the extracted document is returned to the content repository 322 and made available to the client's portal as a finished and processed document.

Alternatively, it is possible for a single process to implement all the functionality of the slaves as outlined in the description of the preferred implementation. The ideas outlined for the preferred implementation are all valid for such an implementation.

Figure 18:
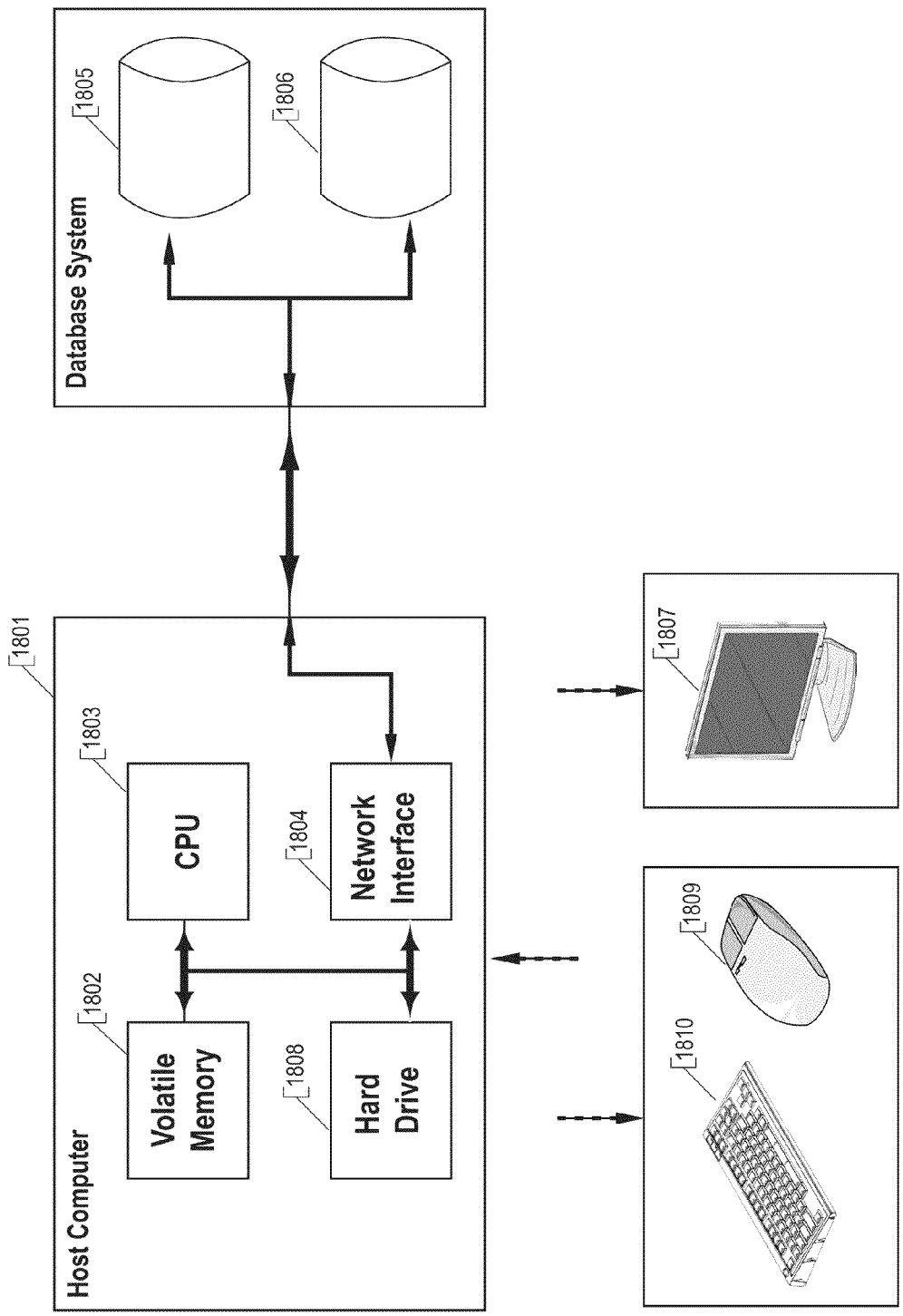
FIG. 18 is an exemplary computer system on which the described invention may run according to a preferred embodiment of the disclosed subject matter.

FIG. 18 is a diagram that depicts the various components of a computerized document data extraction system, according to certain embodiments of the invention. An exemplary document data extraction system may include a host computer 1801 that contains volatile memory, 1802, a persistent storage device such as a hard drive, 1808, a processor, 1803, and a network interface, 1804. Using the network interface, the system computer can interact with databases, 1805, 1806. Although FIG. 18 illustrates a system in which the system computer is separate from the various databases, some or all of the databases may be housed within the host computer, eliminating the need for a network interface. The programmatic processes may be executed on a single host, as shown in FIG. 18, or they may be distributed across multiple hosts.

The host computer shown in FIG. 18 may serve as a document data analysis system. The host computer receives electronic documents from multiple users. Workstations may be connected to a graphical display device, 1807, and to input devices such as a mouse, 1809, and a keyboard, 1810. Alternately, the active user's workstation may comprise a handheld device.

In some embodiments, the flow charts included in this application describe the logical steps that are embodied as computer executable instructions that could be stored in computer readable medium, such as various memories and disks, that, when executed by a processor, such as a server or server cluster, cause the processor to perform the logical steps.

While text extraction and recognition may be performed with OCR and OCR-like techniques it is not limited to such. Other techniques could be used, including image recognition-like techniques.

As described above, preferred embodiments extract image features from a document and use this to assist in dataifying the document category and extracting data from the document. These image features include inherent image features, e.g. lines, line crossings, etc. that are put in place by the document authors (or authors of an original source or blank document) to organize the document or the like. They were typically not included as a means of identifying the document, even though the inventors have discovered that they can be used as such, especially with the use of machine learning techniques.

While many applications can benefit from extracting both image and text features so that the extracted features may be used to dataify documents and extract data from those documents, for some applications, image features alone may suffice. Specifically, some problem domains may have document categories where the inherent image features are sufficiently distinctive to dataify a document and extract data with high enough confidence (even without processing text features.)

Preferred embodiments of the invention may incorporate classification techniques described in the following patent applications, each of which is hereby incorporated by reference herein in its entirety:

U.S. Patent Application Publication No. 2009/0116736, entitled "Systems and Methods to Automatically Classify Electronic Documents Using Extracted Image and Text Features and Using a Machine Learning Subsystem;"

U.S. Patent Application Publication No. 2009/0116757, entitled "Systems and Methods for Classifying Electronic Documents by Extracting and Recognizing Text and Image Features Indicative of Document Categories;"

U.S. Patent Application Publication No. 2009/0116755, entitled "Systems and Methods for Enabling Manual Classification of Unrecognized Documents to Complete Workflow for Electronic Jobs and to Assist Machine Learning of a Recognition System Using Automatically Extracted Features of Unrecognized Documents;"

U.S. Patent Application Publication No. 2009/0116756, entitled "Systems and Methods for Training a Document Classification System Using Documents from a Plurality of Users;"

U.S. Patent Application Publication No. 2009/0116746, entitled "Systems and Methods for Parallel Processing of Document Recognition and Classification Using Extracted Image and Text Features;" and U.S. Patent Application Publication No. 2009/0119296, entitled "Systems and Methods for Handling and Distinguishing Binarized, Background Artifacts in the Vicinity of Document Text and Image Features Indicative of a Document Category."

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. In a document analysis system that receives and processes jobs from a plurality of users, in which each job may contain multiple electronic documents, to extract data from the electronic documents, a method of automatically pre-processing each received electronic document using a plurality of image transformation algorithms to improve subsequent data extraction from said document, the method comprising:
   electronically partitioning each received electronic document page into pieces;
   automatically processing each piece of the received electronic document page using each of a plurality of image pre-processing algorithms to produce a plurality of image variations of each piece; and
   analyzing the outputs of subsequent processing and data extraction, on each of the image variations of the pieces to determine which output is best, from the plurality of outputs for each piece.

* * * * *